United States Patent
Ramirez

(10) Patent No.: US 10,013,263 B2
(45) Date of Patent: Jul. 3, 2018

(54) SYSTEMS AND METHODS METHOD FOR PROVIDING AN INTERACTIVE HELP FILE FOR HOST SOFTWARE USER INTERFACES

(71) Applicant: Vincent Ramirez, Montgomery, NY (US)

(72) Inventor: Vincent Ramirez, Montgomery, NY (US)

( * ) Notice: Subject to any disclaimer, the term of this patent is extended or adjusted under 35 U.S.C. 154(b) by 318 days.

(21) Appl. No.: 15/045,982

(22) Filed: Feb. 17, 2016

(65) Prior Publication Data
US 2017/0235582 A1    Aug. 17, 2017

(51) Int. Cl.
| | |
|---|---|
| *G06F 3/048* | (2013.01) |
| *G06F 9/451* | (2018.01) |
| *G06F 9/44* | (2018.01) |
| *G06F 3/0488* | (2013.01) |
| *G06F 17/24* | (2006.01) |
| *G06F 3/0482* | (2013.01) |
| *G06F 3/0484* | (2013.01) |
| *G06F 3/0481* | (2013.01) |

(52) U.S. Cl.
CPC .......... *G06F 9/453* (2018.02); *G06F 3/0482* (2013.01); *G06F 3/04817* (2013.01); *G06F 3/04842* (2013.01); *G06F 3/04886* (2013.01); *G06F 9/4446* (2013.01); *G06F 17/241* (2013.01)

(58) Field of Classification Search
CPC ......... G06F 17/30017; G06F 17/30784; G06F 17/30743; G06F 9/4446; G06F 15/173; G06F 17/30554; G06F 17/30846; G06F 17/30914; G06F 17/241; G06F 3/04817; G06F 3/0482; G06F 3/04842; G06F 3/04886; G09B 19/0053
See application file for complete search history.

(56) References Cited

U.S. PATENT DOCUMENTS

| | | | | |
|---|---|---|---|---|
| 2008/0036917 A1* | 2/2008 | Pascarella | ............. | G11L 327/11 348/702 |
| 2010/0169780 A1* | 7/2010 | Bryant-Rich | ........ | G11B 27/005 715/719 |
| 2010/0241962 A1* | 9/2010 | Peterson | ............... | G06F 3/0481 715/720 |
| 2011/0282745 A1* | 11/2011 | Meoded | ............. | G06Q 30/0264 705/14.61 |

(Continued)

*Primary Examiner* — Linh K Pham
(74) *Attorney, Agent, or Firm* — Lerner, David, Littenberg, Krumholz & Mentlik, LLP

(57) ABSTRACT

System and methods are provided for an interactive help file for a host software user interface. According to one aspect, a host interface screen having actionable fields is provided and a first virtual button is generated and displayed on the host interface screen. The host interface screen is segmented into zones and, in response to activation of the first virtual button, a plurality of second virtual buttons are generated and displayed on the host interface screen. Following activation of a second virtual button, one or more help files are retrieved, and the host interface screen is transformed such that zones of the host interface screen that are not associated with the activated second virtual button are deactivated, the zone associated with the activated second virtual button is overlaid with a set of annotated links associated with help files, and the transformed host interface screen is displayed.

19 Claims, 16 Drawing Sheets

(56) References Cited

U.S. PATENT DOCUMENTS

| | | | |
|---|---|---|---|
| 2012/0201290 A1* | 8/2012 | Liu | H04N 21/85406 375/240.01 |
| 2012/0259845 A1* | 10/2012 | Matejka | G06F 17/30528 707/723 |
| 2013/0159851 A1* | 6/2013 | Pawar | G06F 3/0481 715/708 |
| 2013/0201327 A1* | 8/2013 | M | H04N 7/181 348/143 |
| 2014/0280296 A1* | 9/2014 | Johnston | G06F 17/30011 707/769 |
| 2016/0027244 A1* | 1/2016 | Adiraju | G07F 17/3225 463/25 |
| 2017/0180768 A1* | 6/2017 | Zuccarini | H04N 21/23430 |

* cited by examiner

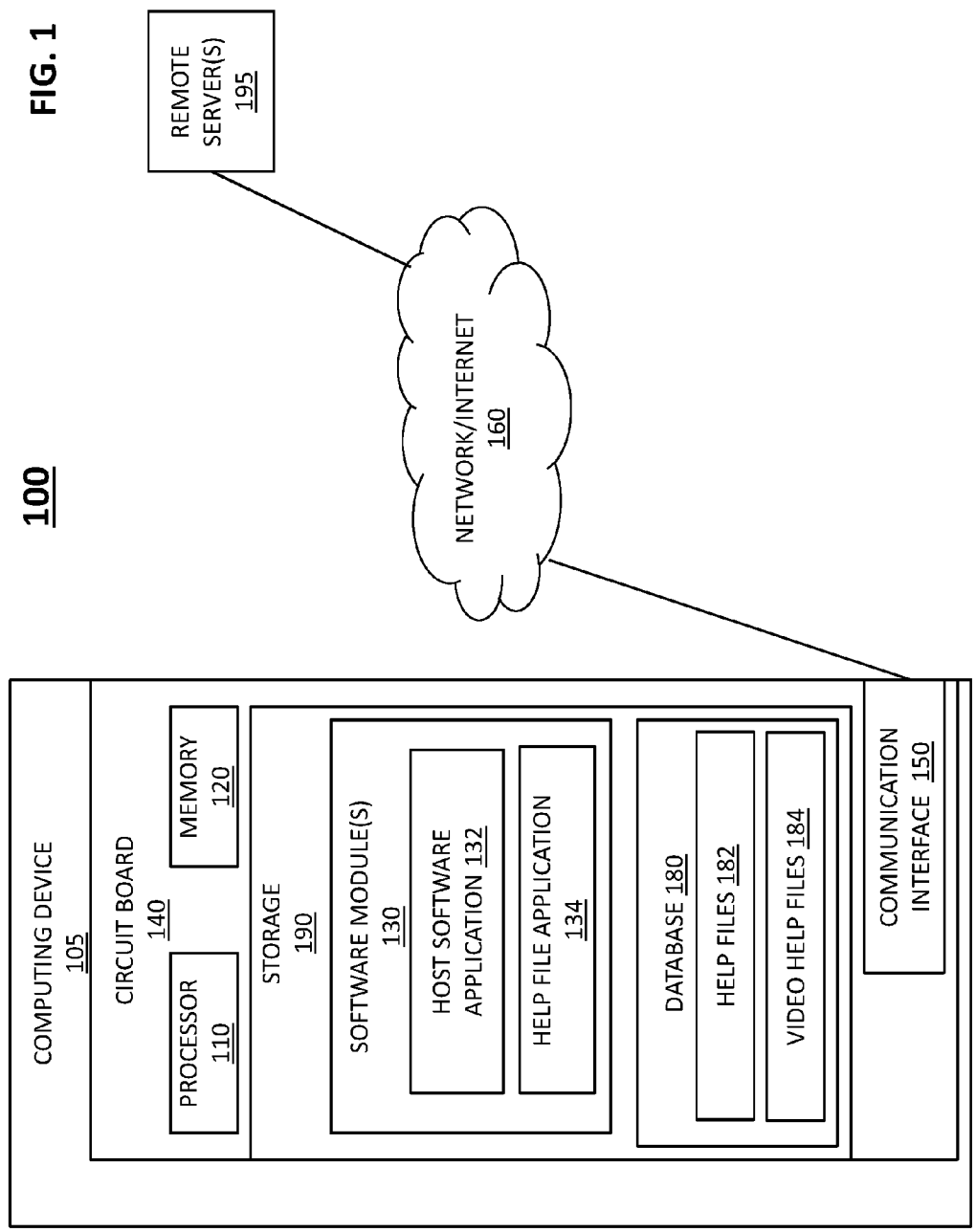

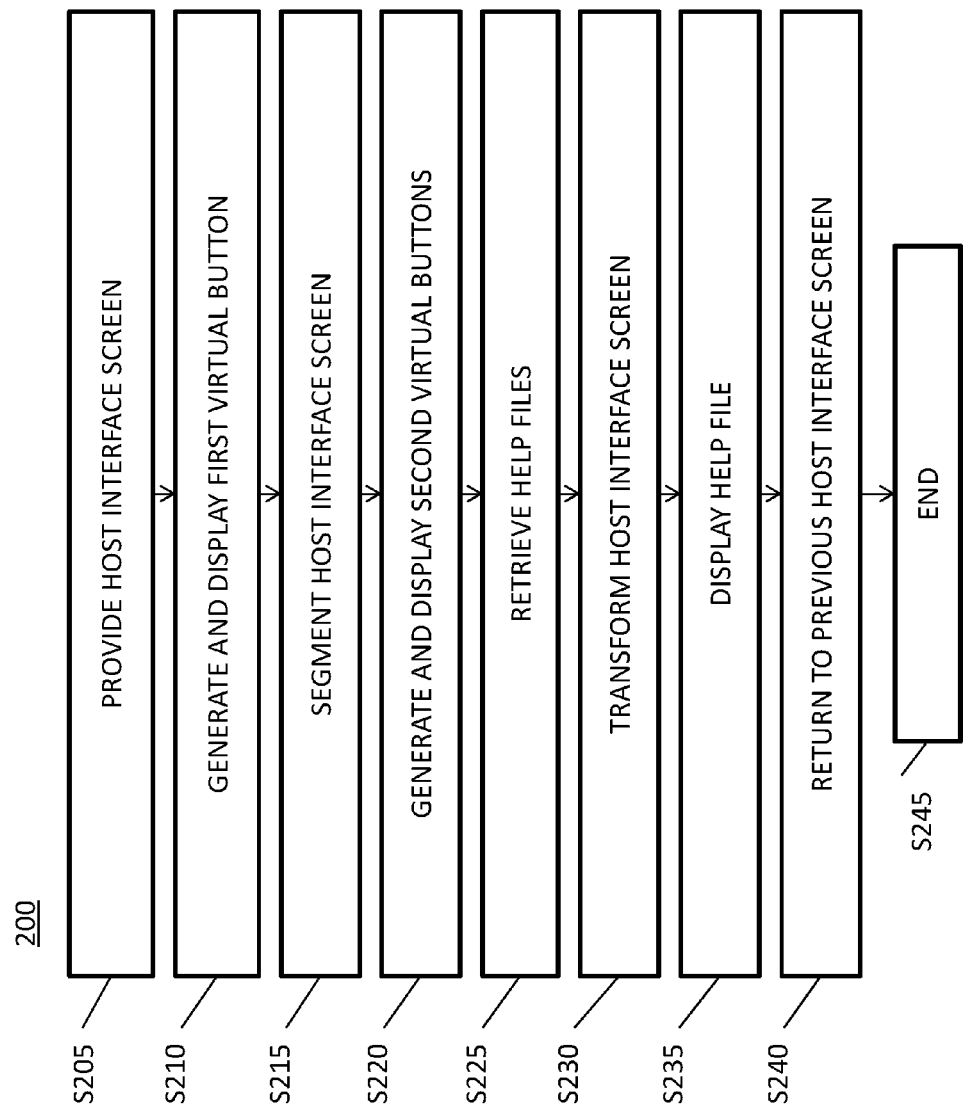

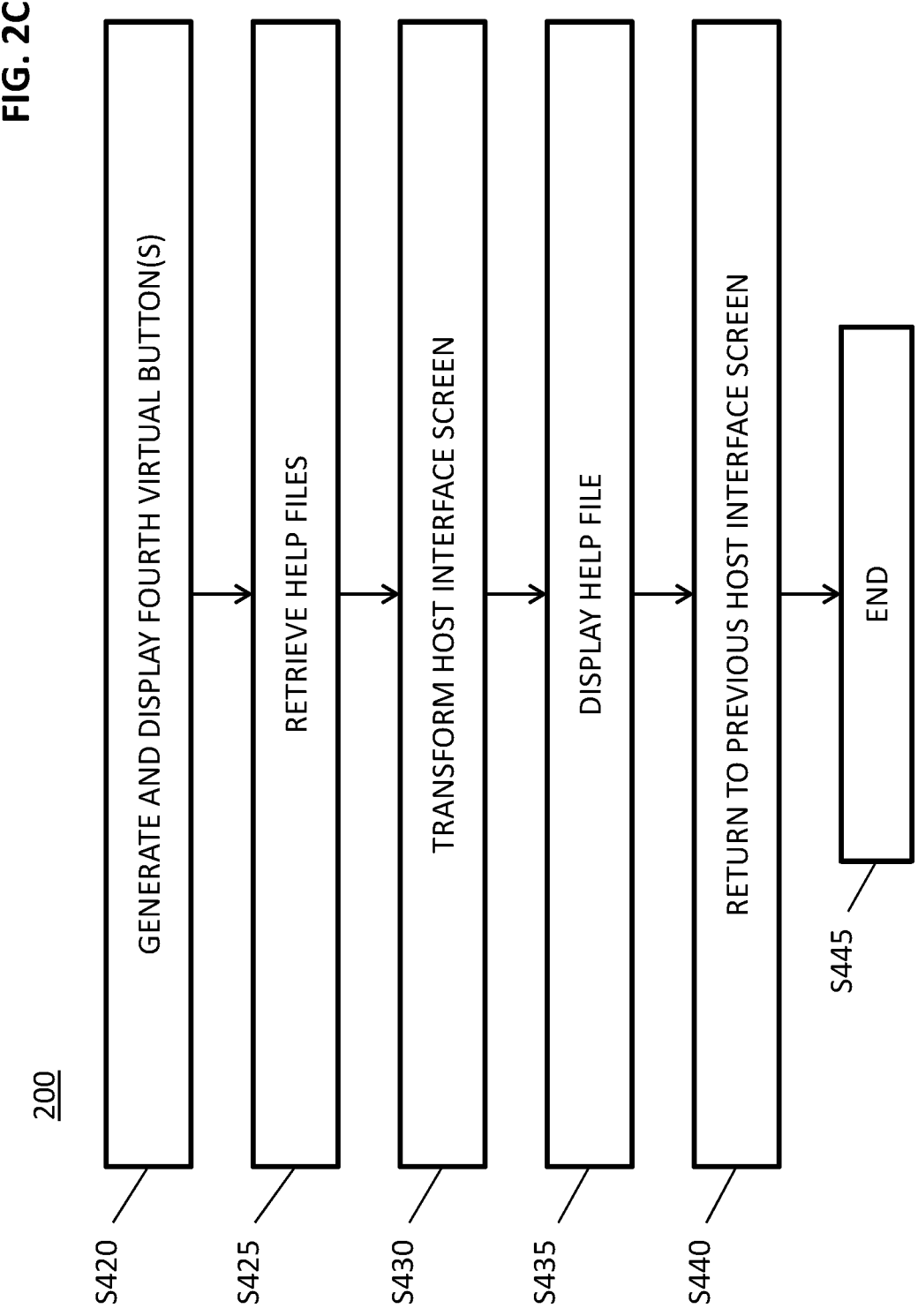

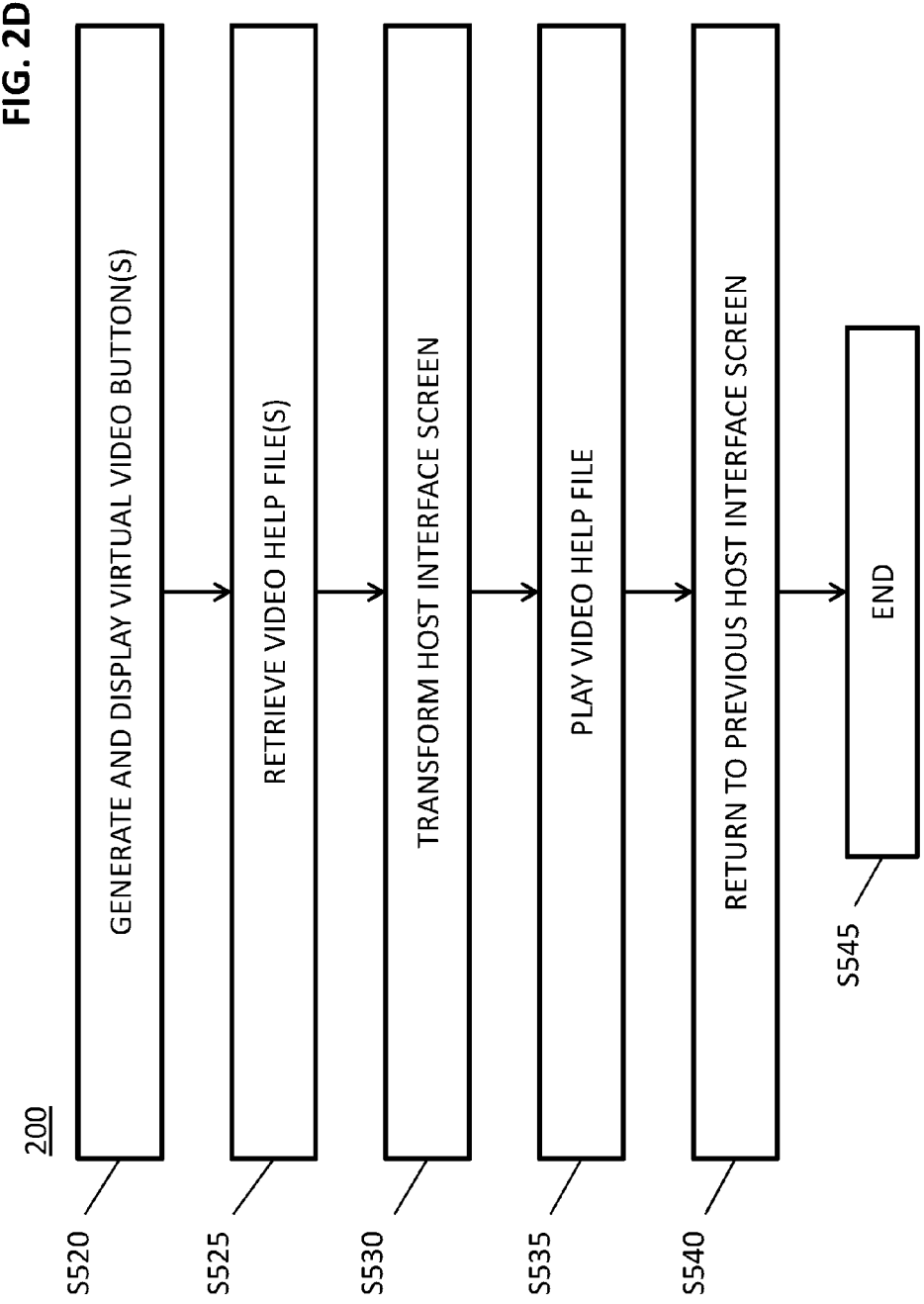

SYSTEMS AND METHODS METHOD FOR PROVIDING AN INTERACTIVE HELP FILE FOR HOST SOFTWARE USER INTERFACES

TECHNICAL FIELD OF THE INVENTION

This patent application relates generally to the field of help files for computer software, and, in particular, to computer-implemented systems and methods for providing targeted help files for use with existing software.

BACKGROUND OF THE DISCLOSURE

Software programs have become increasingly intuitive, allowing users to perform many of the programs general functions with minimal training. However, even frequent users of a software program may not know how to perform certain advanced functions offered by the program without assistance or advanced training. As such, many software programs integrate "help" functions into the software that allow the user to find out how to perform certain functions within the program. For example, software programs typically have a "help" section that allows a user to conduct a keyword search to find articles that provide assistance for performing certain functions within the program.

These are articles are typically written by general category or type of function within the software program and are very comprehensive. Thus, while these articles typically cover all of the functionality that the program has to offer, users may have a difficult time finding an answer to their particular problem. For instance, if a user is trying to determine how to perform a particular function in the program, they may have to sift through pages of irrelevant information within the help article before they find what they are looking for. Additionally, because functions within a program can be categorized in several ways, or can fall under multiple categories, a user may read through an entire help article only to determine that the answer to his or her particular problem is discussed in a separate help article for a different, but related topic. As such, the current help functions of software programs are cumbersome and time-consuming for the user, as users have to sift through long articles to find an answer to their question.

Some software companies also provide technical support, which allows users to communicate directly (e.g., via telephone, instant messaging service) or indirectly (e.g., via email) with an expert in the particular software program. This type of service, however, is very costly for the software companies and can be time-consuming for the user, as users often have substantial waiting times before they can communicate with an expert or receive an answer to their questions.

Accordingly, what is needed is a cost-effective system that allows users to quickly find answers that are targeted to their specific inquiries about a software program. It is with respect to these and other considerations that the disclosure made herein is presented.

SUMMARY OF CERTAIN EMBODIMENTS OF THE DISCLOSURE

Described herein are systems and methods for providing an interactive help file for a host software user interface. According to one aspect, a method for providing an interactive help file for a host software user interface is provided in which a host interface screen having a plurality of actionable fields is provided, and a first virtual button is generated and displayed on the host interface screen, such that the first virtual button overlays a portion of the host interface screen. The host interface screen is segmented into a plurality of zones and, in response to activation of the first virtual button, a plurality of second virtual buttons are generated and displayed on the host interface screen, such that the plurality of second virtual buttons each overlay and are associated with a respective zone among the plurality of zones. In response to activation of one of the second virtual buttons, one or more help files associated with the activated second virtual button are retrieved from a storage coupled to the server. The host interface screen is then transformed such that the zones of the host interface screen that are not associated with the activated second virtual button are deactivated; the zone associated with the activated second virtual button is overlaid with a first set annotated links associated with respective portions of the retrieved help files; and the transformed host interface screen is displayed, whereby the user is provided with the transformed host interface screen and can access the retrieved one or more help files. According to a further aspect, the annotated links include one or more of: text and one or more links to further information contained in the help file.

According to another aspect, a method for providing an interactive help file for a host software user interface is provided in which deactivation of the zones not associated with the activated second virtual button includes one or more of: removing the plurality of second virtual buttons that are not activated and removing from view, deemphasizing, or obscuring one or more portions of the zones that are not associated with the activated second virtual button.

According to another aspect, a method for providing an interactive help file for a host software user interface is provided in which the transformation of the host interface screen includes configuring actionable fields within the zone associated with the activated second virtual button to be interactive and actionable fields within zones not associated with the activated second virtual button to be inactive. In this aspect, user input into actionable fields within the zone associated with the activated second virtual button is recorded and user input into actionable fields within zones not associated with the activated second virtual button is prevented.

These and other aspects, features, and advantages can be appreciated from the accompanying description of certain embodiments of the disclosure and the accompanying drawing figures and claims.

BRIEF DESCRIPTION OF THE DRAWINGS

FIG. 1 is a high-level diagram illustrating an exemplary configuration of a system for providing an interactive help file for a host software user interface ("help file system") in accordance with at least one embodiment disclosed herein;

FIGS. 2A-D are flow diagrams showing routines that illustrates broad aspects of the method for providing an interactive help file for a host software user interface in accordance with at least one embodiment disclosed herein;

DETAILED DESCRIPTION OF CERTAIN EMBODIMENTS OF THE INVENTION

Figure 2B:
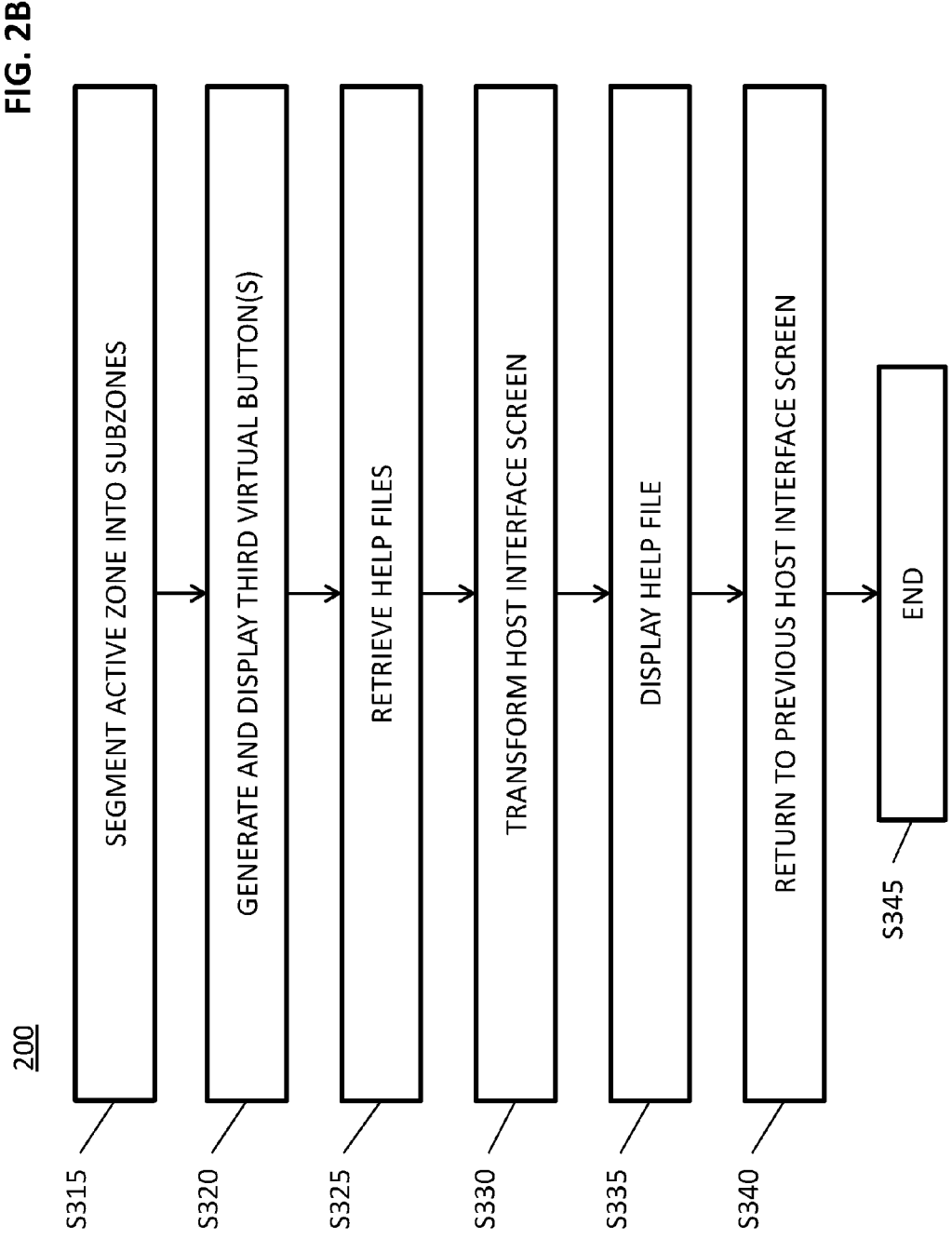

By way of overview and introduction, the present disclosure details systems and methods for providing an interactive help file for a host software user interface. As present approaches have not been highly effective or efficient in helping to answer user queries regarding one or more operations of a particular software program, the present systems and methods utilize various algorithms that execute in a machine to transform the host software user interface automatically to display links overlaying the existing host interface screen of the software program, which allow the user to visually target the operation of the software program that he or she needs help with. The present system and methods further allows the user to provide information on an as-needed basis dynamically and without interrupting continued use and interaction with the host interface of the software program.

More specifically, the system of the present application is configured to display a virtual help button over a portion of the host interface screen of the software program. Upon user activation of the virtual general help button, the system is further configured to overlay the host interface screen with a plurality of virtual specific help buttons, where the specific help buttons overlay respective zones of the host interface screen and each zone comprises one or multiple related operations of the software program. A user can then select a specific help button in the zone of the host interface screen about which the user has a query. Upon the user selecting one of the specific help buttons, the system is configured to transform the host interface screen by deemphasizing the zones of the host interface screen that are not associated with the selected specific help button ("inactive zones"), and overlaying the zone associated with the selected specific help button (the "active zone") with one or more annotated links to help files. The annotated links provide a quick instruction, explanation, and/or description of underlying help files, and the underlying help files are specifically related to the operations of the active zone. The user can then access a more detailed explanation of the help files via the annotated links. In one or more embodiments, the annotated links and the more detailed explanations of the help files can be written at a low readability level, such as a sixth grade readability level, to ensure that all users can understand the functions and operations of the host software. In at least one embodiment, when technical details need to be explained in greater detail in order for the user to understand an operation of the host software, more technical language can be incorporated into the detailed explanations of the help files, while still maintaining a low readability level.

A salient aspect of the present system is that while the specific help buttons overlay the host interface screen, a user can still provide user input on the host interface screen. Similarly, while the annotated links overlay a specific zone of the host interface screen (i.e., following transformation of the host interface screen), the user can still provide user input within that particular zone of the host interface screen, but cannot provide any user input within the zones of the host interfaced that have been removed. Additionally, while the host interface screen is transformed with one or more overlaying virtual buttons, the user's underlying inputs into the host software (e.g., text) remains unaffected.

In one or more embodiments, upon user activation of a specific help button, the system can also be configured to display a virtual video button overlaying a portion of the active zone. Via the virtual video button, a user can then access one or more video help files related to the operations of the host interface within that specific zone. At any time in which the host interface screen is overlaid with virtual buttons and/or annotated links, the user can select the general help button in order to remove the overlaid buttons and/or links, and return to the normal operations of the software program. Accordingly, it can be appreciated that the ultimate goal of the present systems and methods is to allow users to quickly find help files targeted to their specific queries about the host software program, without affecting any previous user inputs into the host software program without leaving the user inputs and still being able to input information of interest with the software program.

The referenced systems and methods for providing an interactive help file for a host software user interface are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

An exemplary computer system is shown as a block diagram in FIG. 1, which is a high-level diagram illustrating one configuration of a system for providing an interactive help file for a host software user interface 100 ("system 100"). In this arrangement, the system 100 includes a computing device 105 of the user ("computing device 105"), which in exemplary implementations can be a personal computer or server. In other implementations, computing device 105 can be a tablet computer, a laptop computer, or a mobile device/smartphone, though it should be understood that computing device 105 of the system 100 can be practically any computing device and/or data processing apparatus capable of embodying the systems and/or methods described herein.

Computing device 105 of system 100 includes a circuit board 140, such as a motherboard, which is operatively connected to various hardware and software components that serve to enable operation of the system 100. The circuit board 140 is operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for instance, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 can also be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language, such as Java, Smalltalk, C++, Python, and JavaScript, or the like, and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer (for example, through the Network/Internet 160 using an Internet Service Provider).

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present disclosure, as is known to those of ordinary skill in the art.

It should be understood that in some illustrative embodiments, one or more of software modules 130 can be downloaded over a network to storage 190 from another device or system via communication interface 150 for use within system 100. For instance, program code stored in a computer readable storage device in a server can be downloaded over a network from the server to the system 100.

Preferably, included among the software modules 130 is host software application 132 and help file application 134 which are executed by processor 110. During execution of the software modules 130, and specifically the host software application 132 and help file application 134, the processor 110 configures the circuit board 140 to perform various operations relating to providing one or more interactive help files for a host software user interface with computing device 105, as will be described in greater detail below. It should be understood that while software modules 130 and/or host software application 132 and/or help file application 134 can be embodied in any number of computer executable formats, in certain implementations the software modules comprise one or more applications that are configured to be executed at computing device 105 in conjunction with one or more applications or 'apps' executing at one or more remote devices, such as remote server(s) 195 and/or one or more viewers such as internet browsers and/or proprietary applications. Host software application 132 and help file application 134 are shown in FIG. 1 as two discrete applications. In such a configuration, help file application 134 can be provided separately from the host software application 132 and is configured to be a stand alone application or plug-in application that is programmed to integrate with the host software application 132 during operation and dynamically modify the operation of the host software application 132 to provide additional features and functionality relating to providing interactive help files and supplement the operation of the host software application 132. However, it can be appreciated that various combinations of features and operations of the help file application 134 and host software application 132 described herein can be integrated into one or more software applications.

Furthermore, in certain implementations, software modules 130 and/or host software application 132 and/or help file application 134 can be configured to execute at the request or selection of a user of one of computing device 105 or remote server(s) 195 (or any other such user having the ability to execute a program in relation to computing device 105, such as a network administrator), while in other implementations computing device 105 can be configured to automatically execute the software modules without requiring an affirmative request to execute. It should also be noted that while FIG. 1 depicts memory 120 oriented on circuit board 140, in an alternate arrangement, memory 120 can be operatively connected to the circuit board 140. In addition, it should be noted that other information and/or data relevant to the operation of the present systems and methods (such as database 180) can also be stored on storage 190, as will be discussed in greater detail below.

Also preferably stored on storage 190 is database 180. As will be described in greater detail below, database 180 contains and/or maintains various data items and elements that are utilized throughout the various operations of system 100, including but not limited to, help files 182, and video help files 184, as will be described in greater detail herein. It should be noted that although database 180 is depicted as being configured locally to computing device 105, in certain implementations database 180 and/or various of the data elements stored therein can be located remotely (such as on remote server(s) 195) and connected to computing device 105 through Network/Internet 160, in a manner known to those of ordinary skill in the art.

As referenced above, it should be noted that in certain implementations, such as the one depicted in FIG. 1, one or more remote servers 195 can be in periodic or ongoing communication with computing device 105 thorough a computer network such as the Internet 160. Though not shown, it should be understood that in certain other implementations, one or more remote servers 195 can be in periodic or ongoing direct communication with computing device 105, such as through communications interface 150.

Communication interface 150 is also operatively connected to circuit board 140. Communication interface 150 can be any interface that enables communication between the computing device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as private networks and the Internet. Such connections can include a wired connection or a wireless connection (e.g. using the IEEE 802.11 standard) though it should be understood that communication interface 150 can be practically any interface that enables communication to/from the circuit board 140.

It should be noted that while FIG. 1 depicts the system 100 with respect to computing device 105, it should be understood that any number of computing devices can interact with the system 100 in the manner described herein. It should be further understood that a substantial number of the operations described herein are initiated by and/or performed in relation to such computing devices. For example, as referenced above, such computing devices can execute applications and/or viewers that request and/or receive data from computing device 105, substantially in the manner described in detail herein.

In the description that follows, certain embodiments and/or arrangements are described with reference to acts and symbolic representations of operations that are performed by one or more devices, such as those depicted in the system 100 of FIG. 1. As such, it will be understood that such acts and operations, which are at times referred to as being computer-executed or computer-implemented, include the manipulation by processor 110 of electrical signals representing data in a structured form. This manipulation transforms the data and/or maintains them at locations in the memory system of the computer (such as memory 120 and/or storage 190), which reconfigures and/or otherwise alters the operation of the system in a manner understood by those skilled in the art. The data structures in which data are maintained are physical locations of the memory that have particular properties defined by the format of the data. However, while an embodiment is being described in the foregoing context, it is not meant to provide architectural limitations to the manner in which different embodiments can be implemented. The different illustrative embodiments can be implemented in a system including components in addition to or in place of those illustrated for the system 100. Other components shown in FIG. 1 can be varied from the illustrative examples shown. The different embodiments can be implemented using any hardware device or system capable of running program code. In another illustrative example, the system 100 can take the form of a hardware unit that has circuits that are manufactured or configured for a particular use. This type of hardware can perform operations without needing program code to be loaded into a memory from a computer readable storage device to be configured to perform the operations.

For example, computing device 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types.

It should be further understood that while the various computing devices and machines referenced herein, including but not limited to, computing device 105, and remote server(s) 195, are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

The operation of the system 100 and the various elements and components described above will be further appreciated with reference to the method for providing an interactive help file for a host software user interface as described below, in conjunction with FIGS. 2-13.

FIGS. 2A-D show flow diagram showing routines that illustrates broad aspects of a method for providing an interactive help file for a host software user interface in accordance with one or more embodiments of the present application. It should be appreciated that several of the logical operations described herein are implemented (1) as a sequence of computer implemented acts or program modules running on system 100, and/or (2) as interconnected machine logic circuits or circuit modules within the system 100. The implementation is a matter of choice dependent on the requirements of the device (e.g., size, energy, consumption, performance, etc.). Accordingly, the logical operations described herein are referred to variously as operations, steps, structural devices, acts, or modules. As referenced above, several of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

FIG. 2A shows a flow diagram showing routine 200 that illustrates a broad aspect of the method of the present application in accordance with at least one embodiment. The method begins at step S205, where the processor 110 executing one or more software modules 130, including preferably host software application 132, configures the computing device 105 to provide a host interface screen having a plurality of actionable fields. The host software application can be any host software application, including but not limited to a word processing application, an email application, a spreadsheet application, a presentation application, a portable document format (pdf) application, and a web browser application. For example, as shown in FIGS. 3-13 and discussed in greater detail below, the host software application can be a label and envelope and label generation application. Further, the host interface screen can be any interface screen provided via the execution of the host software application. Additionally, in one or more embodiments, "actionable fields" generally includes any area of the host interface screen that receives and responds to user input, such as a button or an area in which the user can input text (e.g., a text box) and that is processed by the host software application accordingly.

Figure 3A:
FIGS. 3A-B depict a screenshot of an exemplary host software user interface screen that integrates the virtual general help button of the help file system in accordance with at least one embodiment disclosed herein.
Figure 3B:
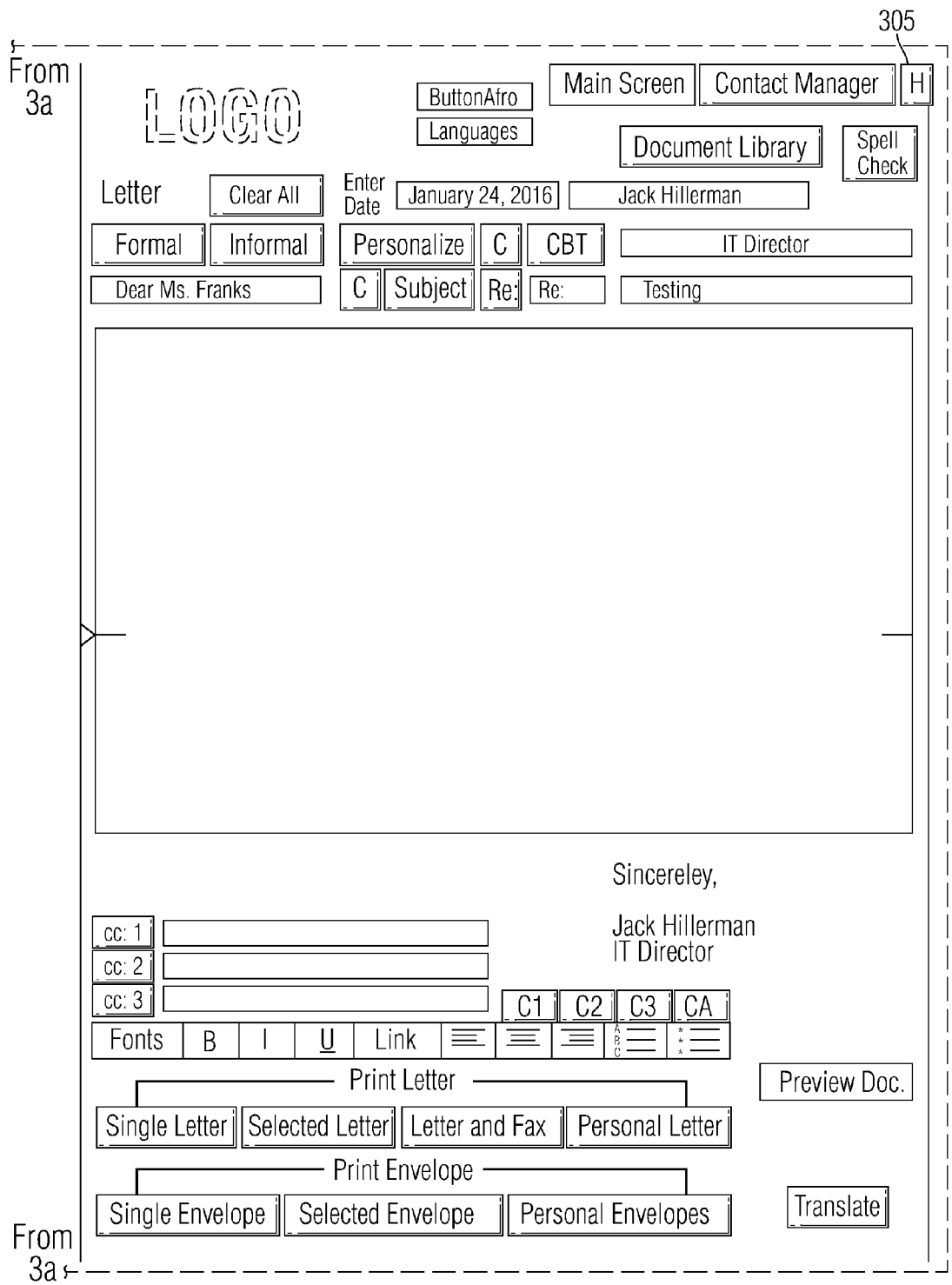

At step S210, the processor 110 executing one or more software modules 130, including preferably host software application 132 and help file application 134, configures the computing device 105 to generate and display a general virtual help button (first virtual button) on the provided host interface screen, such that the general virtual help button overlays a portion of the host interface screen. In at least one embodiment, the processor can be configured to display the general virtual help button such that it is displayed at a portion of the host interface screen that is empty, meaning that there are no actionable fields in that portion of the host interface screen. An example implementation of step S210 is shown at FIGS. 3A-B, which is a screenshot of a host interface screen having a general virtual help button overlaying a portion of the screen. In this example, the general virtual help button is denoted by "H" (305), and is shown in the upper right hand corner of the host interface screen. Here, the "H" button 305 is shown next to several actionable fields, but is provided at an empty corner of the host interface screen. This allows the user to still interact with all of the actionable fields of the host interface screen even when the general virtual help button is displayed. It should be noted that, in one or more embodiments, the general help button can be shown on any screen of the host software user interface.

At step S215, the processor 110 executing one or more software modules 130, including preferably host software application 132 and help file application 134, configures the computing device 105 to segment the host interface screen into a plurality of zones. In one or more embodiments, the processor 110 configures the computing device 105 to segment to the host interface screen into a plurality of zones based on the actionable fields and/or operations that can be activated in each portion of the screen. In most interface screens of software applications, similar operations and/or actionable fields are grouped together in particular portions of the interface screen. As such, in one or more embodiments, the processor 110 configures the computing device 105 to segment the host interface screen into zones in which similar operations and/or actionable fields of the host interface screen are in the same zone, so long as the host interface screen is already organized in such a fashion. In one or more embodiments, the segmenting of the host interface screen into zones has no effect on the visual appearance of the screen to the user.

With continued reference to FIG. 2A, at step S220, the processor 110 executing one or more software modules 130, including preferably host software application 132 and help file application 134, configures the computing device 105 to generate and display a plurality of specific virtual help buttons (second virtual help buttons) on the host interface screen in response to activation of the general virtual help button. In one or more embodiments, the general virtual help button can be activated via user input on computing device 105 (e.g., by the user activating the general virtual help button with a mouse click on the button). In at least one embodiment, the general virtual help button can be activated by a remote computing device (e.g., server 195), such as by user input by a network administrator. In some embodiments, the activation of the virtual help button can be precipitated by an error in a user input, say, an invalid value or action. At step S220, the processor 110 configures the computing device 105 to display each of the plurality of specific virtual help buttons in a respective zone among the plurality of zones that were created in step S215. In other words, the specific virtual help buttons each overlay a respective zone of the host interface screen.

In one or more embodiments, the specific virtual help buttons can overlay empty portions of the host interface screen (i.e., portions with no actionable fields) and/or can overlay a portion of one or more actionable fields. By not covering any entire actionable field (e.g., button) of the host interface screen, the user can still provide user input in any available actionable field even as the specific virtual help buttons are overlaying portions of the screen. As will be explained in greater detail below, in one or more embodiments, each specific virtual help button is associated with one or more help files and/or video help files. In one or more embodiments, the specific virtual help buttons are each associated with a specific zone of the host interface screen based on the operations/actionable fields in that zone, and as such the help files associated with each specific virtual help button are also associated with the operations and/or actionable fields in that zone.

Figure 4:
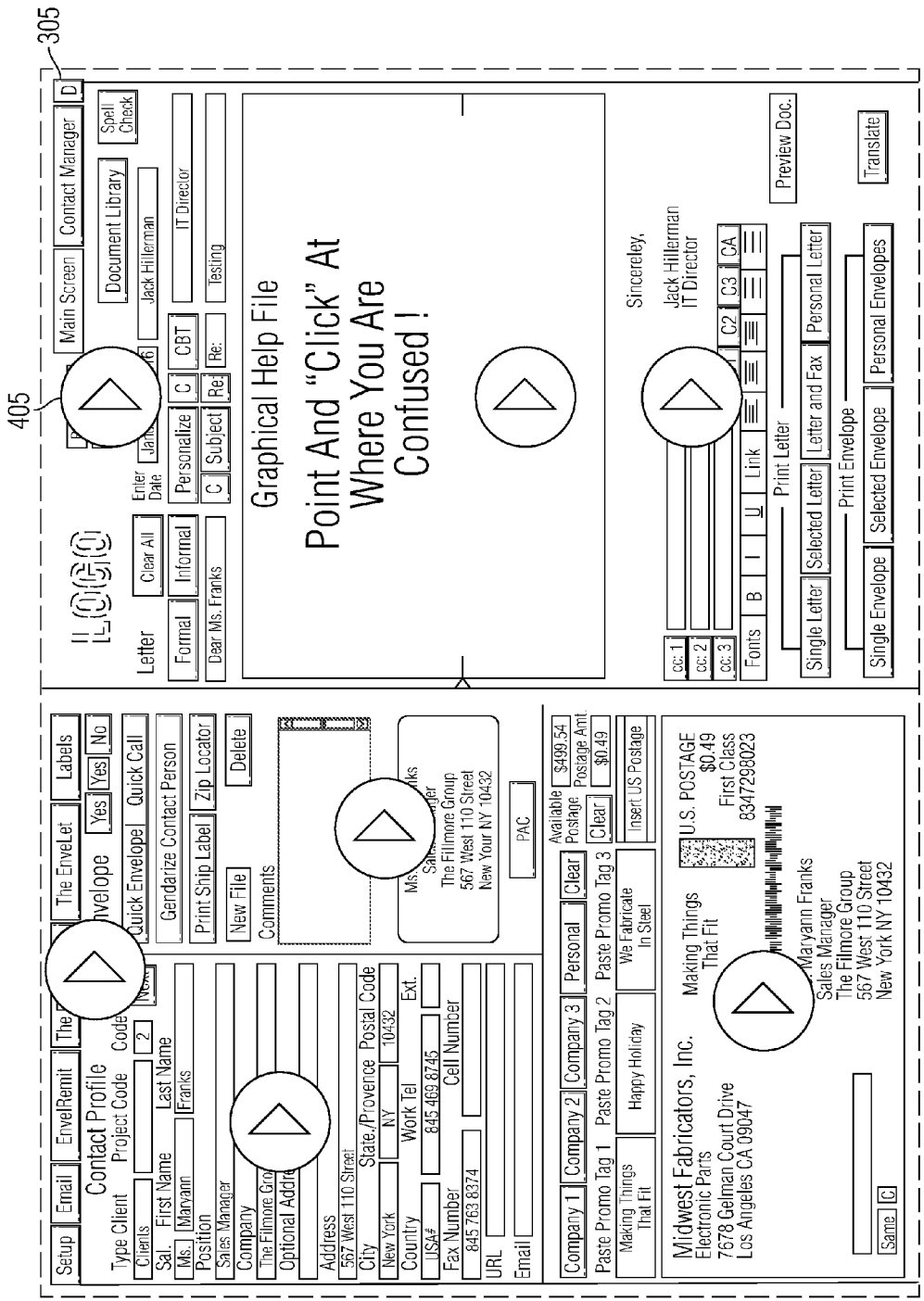
FIG. 4 depicts a screenshot of an exemplary host software user interface screen that integrates a plurality of virtual specific help buttons of the help file system in accordance with at least one embodiment disclosed herein.

An example implementation of step S220 is shown at FIG. 4, which a screenshot of a host interface screen having a plurality of specific virtual help buttons overlaying specific zones of the host interface screen. As shown in FIG. 4, the specific virtual help buttons 405 each overlay distinct zones of the host interface screen based on the operations and/or actionable fields that are in that zone. For example, one specific virtual help button overlays the zone of the screen dedicated to the envelope image (bottom left), while another specific virtual help button overlays the zone of the screen dedicated to the contact profile entries (upper left). As such, the help files associated with the specific virtual help button in the envelope image zone will be associated with operations regarding the envelope image and the help files associated with the specific virtual help button in the contact profile entries zone will be associated with operations regarding the contact profile.

In FIG. 4, the general virtual help button 305 as denoted by "D" and the specific virtual help buttons 405 that are denoted a prototypical "play" button. However, it should be understood that, in accordance with one or more embodiments, the icons for both the general and specific virtual buttons can be any icon, including shapes, letters, numbers, or any other identifier. In one or more embodiments, these icons can be stored in the memory 120 and/or storage 190 of the computing device 105. In at least one embodiment, the icons can be stored in the help file application 134 or database 180, or remotely such as on remote server 195.

Turning back to FIG. 2A and routine 200, at step S225, the processor 110 executing one or more software modules 130, including preferably host software application 132 and help file application 134, configures the computing device 105, in response to activation of one of the plurality of specific virtual help buttons, to retrieve one or more help files associated with the activated specific virtual help button. In one or more embodiments, as shown in FIG. 1, the one or more help files (182) are pre-stored in the database 180. As such, the processor 110 configures the computing device 105 to retrieve the one or more help files 182 from the database 180. In other implementations, the help files can be stored in memory 120, or could be stored on a remote server or computing device (e.g., server 195). In one or more embodiments, the processor configures the computing device 105 to retrieve only those help files that are associated with the activated specific virtual help button. For example, referring again to FIG. 4, if the specific virtual help button overlaying the contact profile zone is activated, then the processor 110 can configure the computing device 105 to retrieve only those help files that are related to operations and/or actionable fields of the contact profile zone.

As mentioned above with respect to the general virtual help button (e.g. step S220), in one or more embodiments, the specific virtual help button can be activated via user input on computing device 105 (e.g., user pressing on the virtual help button) or automatically as a result of invalid user actions. In at least one embodiment, the specific virtual help button can be activated by a remote computing device (e.g., remote server 195), such as by remote input by a network administrator.

At step S230, the processor 110 executing one or more software modules 130, including preferably host software application 132 and help file application 134, configures the computing device 105, in response to activation of one of the plurality of specific virtual help buttons, to transform the host interface screen. In one or more embodiments, following the activation of a specific virtual help button, the processor 110 configures the computing device 105 to transform the host interface screen such that the zones of the host interface screen that are not associated with the activated specific virtual help button (the "inactive zones") are removed from view, deactivated, minimized, and/or deemphasized. Further, in addition to removing the inactive zones, the processor 110 configures the computing device 105 to overlay the zone that is associated with the activated specific virtual help button (the "active zone") with one or more annotated links to the retrieved help files. As discussed briefly above, in one or more embodiments, the annotated links can comprise a brief explanation or instruction or a description (e.g., textual description) of an underlying help file(s) to which it links. In at least one embodiment, one or more of the annotated links comprise a hyperlink to at least one retrieved help file or a portion of a help file. By selectively transforming the host interface screen to remove, deactivate, minimize, and/or deemphasize the inactive zones, and to overlay the active zone with annotated links, the system isolates the areas of the host software interface that interest the user. Thus, the system of the present application augments the normal operation of the underlying host software program.

Figure 5:
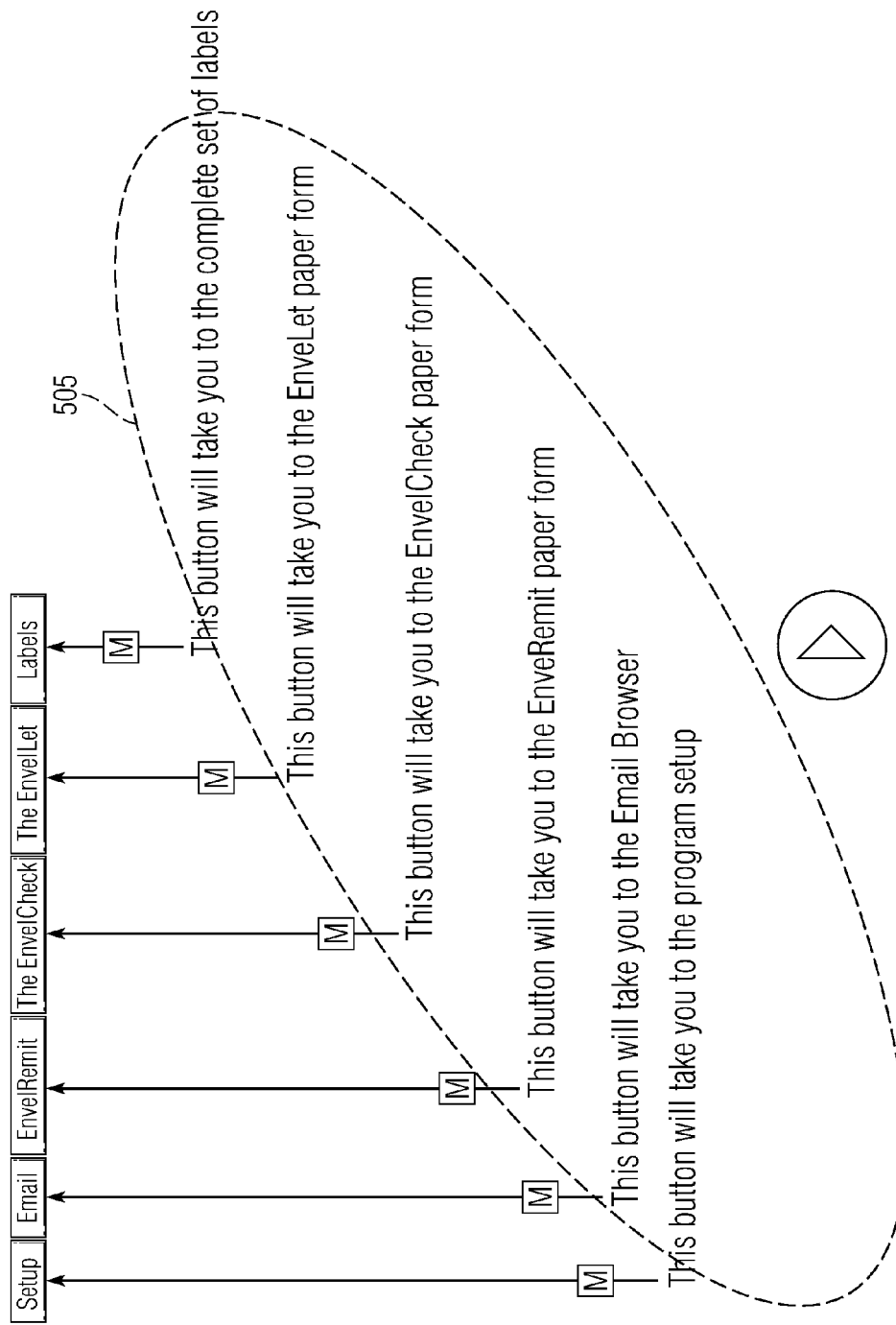
FIG. 5 depicts a screenshot of an exemplary host software user interface screen that integrates a plurality of annotated links of the help file system in accordance with at least one embodiment disclosed herein.
Figure 6:
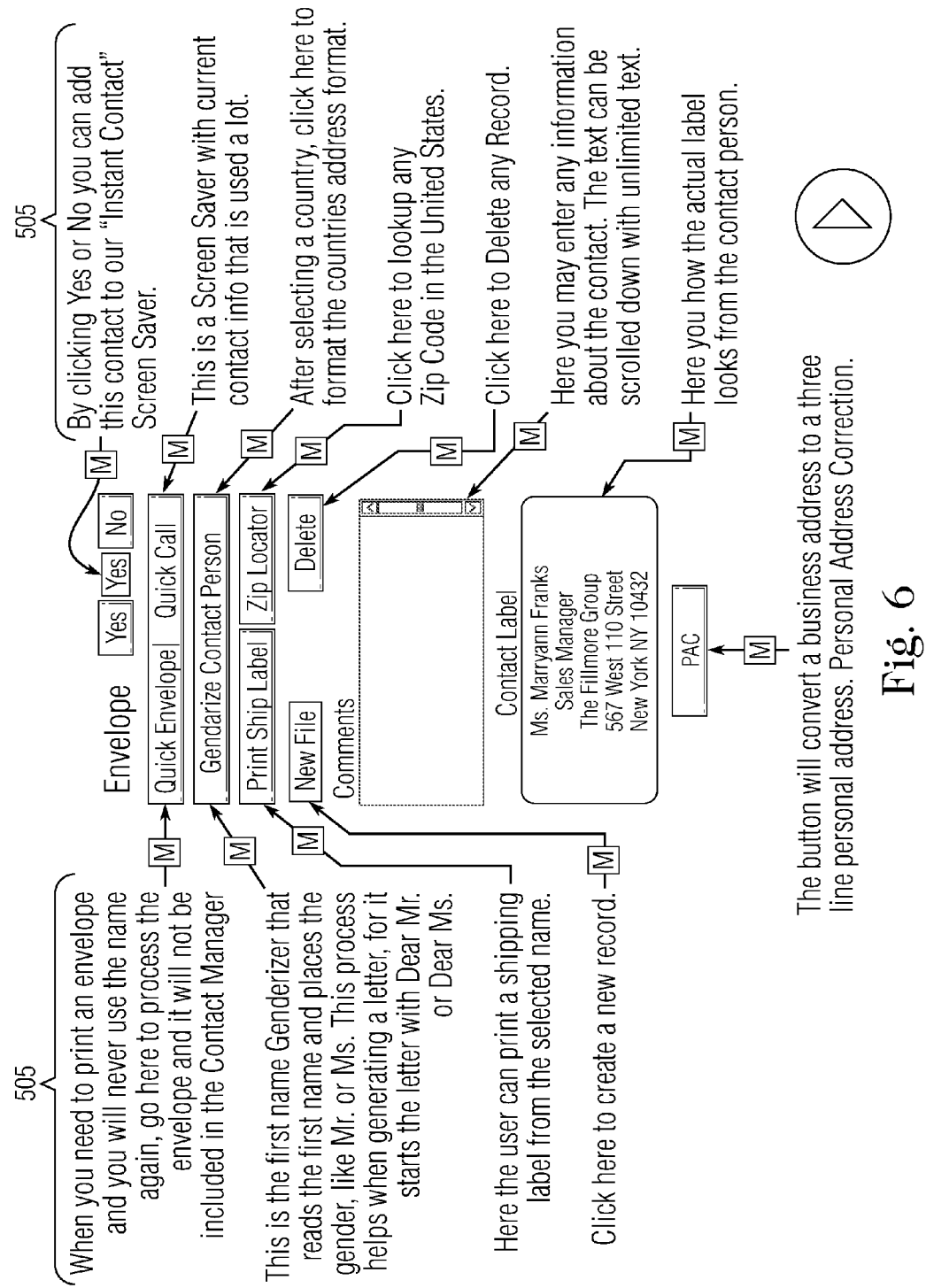
FIG. 6 depicts a screenshot of another exemplary host software user interface screen that integrates a plurality of annotated links of the help file system in accordance with at least one embodiment disclosed herein.

An example implementation of step S230 is shown at FIGS. 4-6. As discussed above, FIG. 4 a screenshot of a host interface screen having a plurality of specific virtual help buttons overlaying specific zones of the host interface screen. In FIG. 4, one of the specific virtual help buttons (405) overlays the zone that includes the menu bar (top left corner), which includes "Setup", "Email", "EnvelRemit", "The EnvelCheck", "The EnvelLet", and "Labels". Upon activation of this specific virtual help button (e.g., via user input, such as using the mouse to click on the virtual button), the host interface screen is transformed to the screen shown at FIG. 5. As shown at FIG. 5, the host interface screen has been transformed such that the inactive zones of the host interface screen are removed from view, and the active zone is now overlaid with annotated links 505. Similarly, referring again to FIG. 4, if, alternatively, the specific virtual help button that overlays the center zone (the zone including the "Comments" box) is activated, then the host interface screen is transformed to the screen shown in FIG. 6. As shown at FIG. 6, the host interface screen has been transformed such that the inactive zones of the host interface screen are removed from view, and the active zone (now, the zone that includes the "Comments" box) is overlaid with annotated links 505. In addition, the active zone can be enlarged, rearranged, reconfigured, and/or highlighted in one or more respects.

In accordance with one or more embodiments, once the host interface screen has been transformed to show only the active zone associated with the activated specific virtual help button, only actionable fields and/or operations in the active zone of the host interface screen can be manipulated. Said differently, when the host interface screen is transformed by the help file application to only show the active zone, the help file application can selectively enable certain fields such that the user can still manipulate actionable fields (e.g., press a button, input text) in the active zone; however, the user cannot manipulate actionable fields in the inactive zones, as they have been removed and are not visible to the user. For example, referring again to FIG. 6, in this transformed host interface screen, the user can still manipulate action fields in the active zone, such as by inputting text in the "Comments" box. However, the user cannot access any of the actionable fields in the inactive zones of the transformed host interface screen, as they not visible to the user. Thus, the system of the present application further augments the normal operation of the underlying host software program.

Continuing with the example of FIG. 6, a user can provide user input, in this case text, to the "Comments" box. Upon the user input being provided by the user, the help file application receives the user input (e.g., text) and translates the user input to provide the input to the host software application for processing. After processing of the user input, the host software interface screen is dynamically updated based on the user input. In this example, the text that was input by the user would be dynamically updated and shown by the corresponding actionable field (here, the "Comments" box) of the host interface screen.

Turning back to FIG. 2A and routine 200, at step S235, the processor 110 executing one or more software modules 130, including preferably host software application 132 and help file application 134, configures the computing device 105, in response to activation of one of the plurality of annotated links, to display a help file. In one or more embodiments, on the transformed host interface screen, each of the plurality of annotated links is a link to at least one of the help files 182. As such, upon activation of one of the annotated links (e.g., via user input), the processor 110 can configure the computing device 105 to display the help file. In one or more embodiments, the displayed help file can overlay the entire host interface screen, or alternatively, the displayed help file can overlay only a portion of the host interface screen. In at least one embodiment, the actionable fields can be rearranged or moved to enable viewing of the help file and concurrent interaction with the actionable fields.

In at least one alternative embodiment, the help file can be displayed on the display screen of the computing device 105 using an application other than the host software application 134 or help file application 134, such as a web browser application. For example, in at least one implementation, the activated annotated link can be a hyperlink to a website such that, upon activation, the processor 110 configures the computing device 105 to open a web browser application to view the website containing the help file.

In accordance with one or more embodiments, help files can comprise any type of media file, including but not limited to a word document (e.g., .doc, .docx), an image file (e.g., .jpg, .jpeg), a video file, a pdf file, a presentation file (e.g., .ppt), a spreadsheet file, or the like.

With continued reference to FIG. 2A, at step S240, the processor 110 executing one or more software modules 130, including preferably host software application 132 and help file application 134, configures the computing device 105 to return the host interface screen to its previous state in response to activation of the general virtual help button. In instances in which the host interface screen displays a help file, one or more annotated links, and/or one or more specific virtual help buttons, activation of the general virtual help button will transform the host interface screen back to the previous iteration of the host interface screen. For example, when the host interface screen is displaying only the active zone featuring one or more annotated links (e.g., FIG. 5), activation of the general virtual help button causes the processor 110 to configure the computing device 105 to transform the host interface screen back to the screen in which all of the specific virtual help buttons overlay their respective zones and the previously inactive zones are now visible again to the user (e.g., FIG. 4). Similarly, when the host interface screen is displaying all the specific virtual help buttons overlaying their respective zones, activation of the general virtual help button causes the processor 110 to configure the computing device 105 to transform the host interface screen back to the screen in which only the general virtual help button overlays a portion of the host interface screen, and no specific virtual help buttons appear (e.g., FIGS. 3A-B). Alternative methods for exiting the help screens and returning to the host interface screen are also possible without departing from the scope of the invention. In one or more embodiments, the process then ends at step S245.

FIG. 2B shows additional aspects of routine 200 and illustrates broad aspects of the methods of the present application in accordance with at least one embodiment. With reference to FIG. 2B, at step S315, the processor 110 executing one or more software modules 130, including preferably host software application 132 and help file application 134, configures the computing device 105 to segment an active zone of the host interface screen into a plurality of subzones. In one or more embodiments, after the host interface screen has been transformed such that only the active zone and its annotated links are present on host interface screen, the processor 110 can configure the computing device 105 to segment the active zone into a plurality of subzones. In one or more embodiments, each annotated link in the active zone overlays a respective subzone. Step S315 can occur, for example, in instances in which the active zone contains many actionable fields and thus requires further categorizing into subzones to allow the user to more efficiently target the actionable field and/or operation about which he or she has a question.

Figure 7:
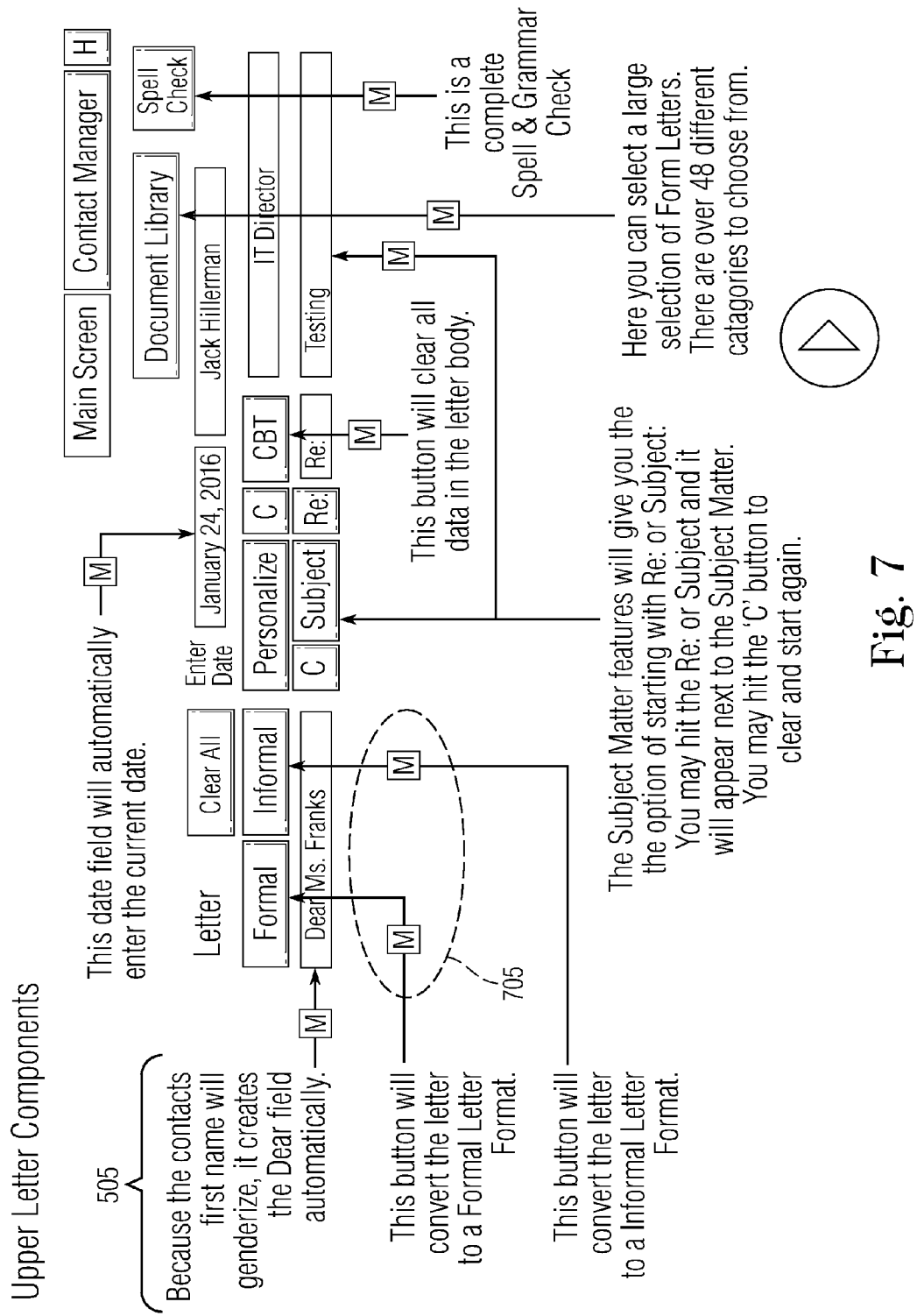
FIG. 7 depicts a screenshot of an exemplary host software user interface screen that integrates a plurality of annotated links and a plurality of third virtual buttons of the help file system in accordance with at least one embodiment disclosed herein.

At step S320 the processor 110 executing one or more software modules 130, including preferably host software application 132 and help file application 134, configures the computing device 105 to generate and display at least one third virtual button associated with at least one annotated link. In one or more embodiments, one or more annotated links can further comprise a third virtual button. For example, FIG. 7 shows a screenshot of an active zone comprising annotated links 505 overlaying their respective subzones, and a plurality of third virtual buttons 705 attached to their respective annotated links 505. As such, it is to be understood that the third virtual buttons are associated with the same subzone that their respective annotated links are attached to. In one or more embodiments, activation of one or more of the third virtual buttons causes the host interface to further transform as discussed in greater detail below.

With continued reference to FIG. 2B, at step S325, the processor 110 executing one or more software modules 130, including preferably host software application 132 and help file application 134, configures the computing device 105, in response to activation of one of the plurality of third virtual buttons, to retrieve one or more help files associated with the activated third virtual button. In one or more embodiments, the one or more third virtual buttons are associated with additional help files not linked to the present annotated links. As such, activation of a third virtual button causes the computing device to retrieve the one or more help files associated with activated third virtual button from database 180. As noted above with regards to step S225, in other implementations, the help files can alternatively be stored in memory 120, or could be stored on a remote server or computing device (e.g., server 195).

At step S330, the processor 110 executing one or more software modules 130, including preferably host software application 132 and help file application 134, configures the computing device 105, in response to activation of one of the plurality of third virtual buttons, to transform the host interface screen. In one or more embodiments, following the activation of a third virtual button, the processor 110 configures the computing device 105 to transform the host interface screen such that the subzones of the host interface screen that are not associated with the activated third virtual button (the "inactive subzones") are removed from view. In addition to removing the inactive subzones, the processor 110 configures the computing device 105 to overlay the subzone that is associated with the activated specific virtual help button (the "active subzone") with one or more annotated links to the help files retrieved at step S325.

Figure 8:
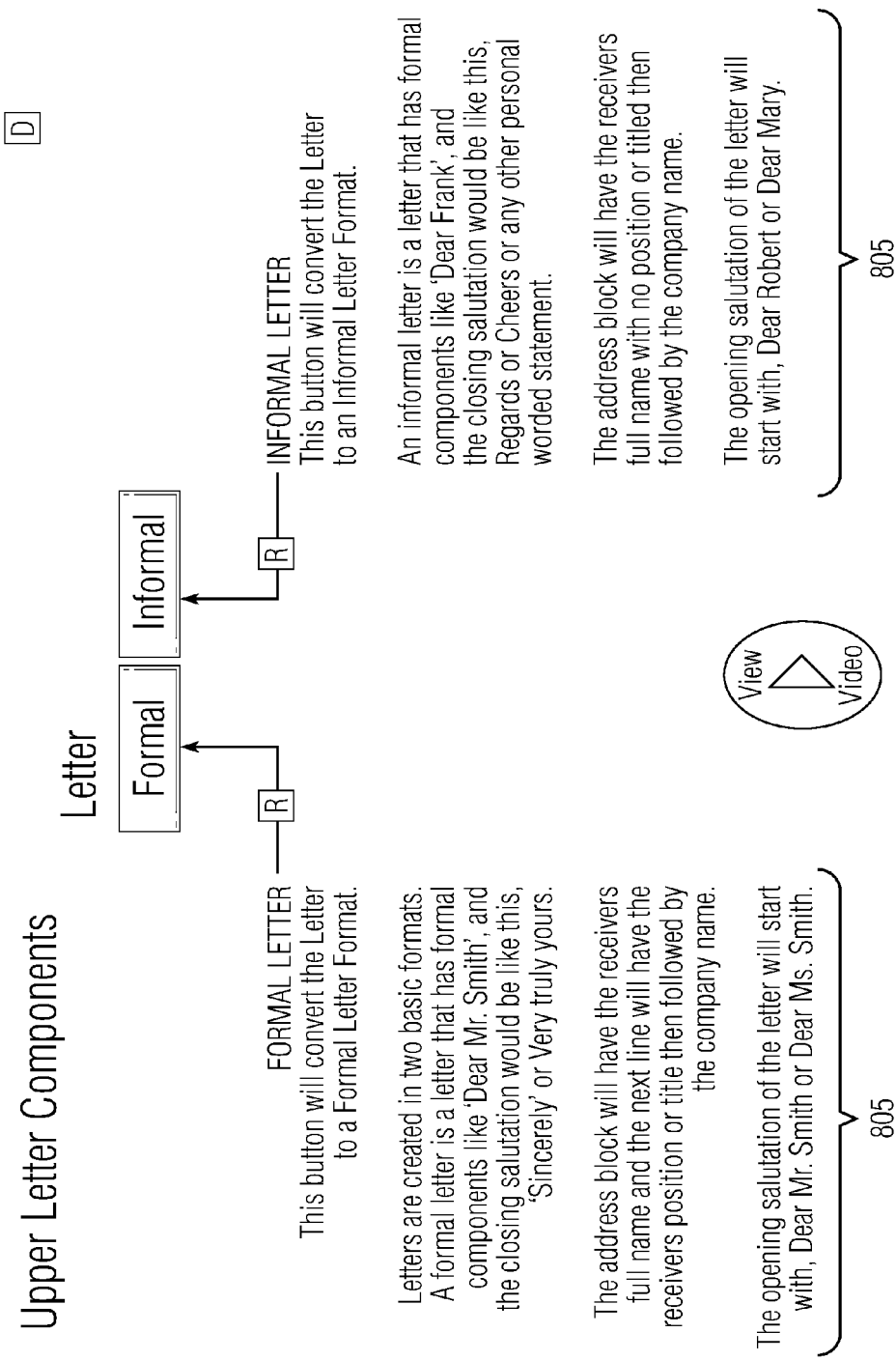
FIG. 8 depicts a screenshot of an exemplary host software user interface screen that integrates a plurality of annotated links specific to the operations of an active subzone of the help file system in accordance with at least one embodiment disclosed herein.

An example implementation of step S330 is shown at FIGS. 7-8. As discussed above, FIG. 7 shows a plurality of third virtual buttons 705 (here, denoted by the letter "M") attached to their respective annotated links 505, which overlaying their respective subzones. In FIG. 7, two of the third virtual buttons 705 overlay the subzone that includes the buttons "Formal" and "Informal". Upon activation of any of the third virtual buttons (e.g., via user input), the host interface screen is transformed to the screen shown at FIG. 8. As shown at FIG. 8, the host interface screen has been transformed such that the inactive subzones of the host interface screen are removed from view, and the active subzone is now overlaid with annotated links 805 specific to the operations of the active subzone. In one or more embodiments, at least some of the annotated links shown in the active subzone of the transformed host interface screen can be the same as at least some of annotated links shown in the active zone.

In accordance with one or more embodiments, once the host interface screen has been transformed to show only the active subzone associated with the activated specific virtual help button, only actionable fields and/or operations in the active subzone of the host interface screen can be manipulated. As such, the user can manipulate actionable fields in the active subzone (e.g., press a button, input text), but the user cannot manipulate actionable fields in the inactive zones or subzones, as they are not visible to the user. For example, referring again to FIG. 8, in this transformed host interface screen, the user can still manipulate action fields in the active zone, such as by pressing on the "Formal" or "Informal" buttons. However, the user cannot access any of the actionable fields in the inactive subzones of shown in FIG. 7, as they not visible to the user.

Returning to FIG. 2B, at step S335, the processor 110 executing one or more software modules 130, including preferably host software application 132 and help file application 134, configures the computing device 105, in response to activation of one of the plurality of annotated links associated with active subzone, to display a help file. In one or more embodiments, on the transformed host interface screen (step S330), each of the plurality of annotated links is a link to at least one of the help files 182. Thus, upon activation of one of the annotated links (e.g., via user input), the processor 110 can configure the computing device 105 to display the help file. As discussed above with reference to step S235, in one or more embodiments, the displayed help file can overlay the entire host interface screen or can overlay only a portion of the host interface screen, or alternatively, can be displayed on the display screen of the computing device 105 using an application other than the host software application 134 or help file application 134, such as a web browser application.

At step S340, the processor 110 executing one or more software modules 130, including preferably host software application 132 and help file application 134, configures the computing device 105 to return the host interface screen to its previous state in response to activation of the general virtual help button. Similar to step S240, in instances in which the host interface screen displays a help file, one or more annotated links, one or more third virtual buttons, and/or one or more specific virtual help buttons, activation of the general virtual help button will transform the host interface screen back to the previous iteration of the host interface screen. For example, when the host interface screen is displaying only the active subzone featuring one or more annotated links (e.g., FIG. 8), activation of the general virtual help button causes the processor 110 to configure the computing device 105 to transform the host interface screen back to the screen in which all of the previously inactive subzones are now visible again to the user (e.g., FIG. 7). Alternative methods for exiting the help screens and returning to the host interface screen are also possible without departing from the scope of the invention. In one or more embodiments, the process then ends at step S345.

FIG. 2C shows additional aspects of routine 200 and illustrates broad aspects of the method of the present application in accordance with at least one embodiment. With reference to FIG. 2C, at step S420, the processor 110 executing one or more software modules 130, including preferably host software application 132 and help file application 134, configures the computing device 105 to generate and display one or more fourth virtual buttons on the host interface screen. In one or more embodiments, after the host interface screen has been transformed such that only an active zone and its annotated links are present on host interface screen (or, in certain implementations contemporaneously), the processor 110 can configure the computing device 105 to generate and display one or more fourth virtual buttons on the host interface screen. In certain implementations, a particular active zone can have so many actionable fields and/or operations that all of the annotated links associated with the actionable fields and/or operations cannot fit onto the host interface screen. As such, the processor 110 can configure the computing device 105 to generate and display at least one fourth virtual button, wherein activation of the fourth virtual button results in the transformation of the host interface screen and the display of the additional annotated links that could not fit in the host interface screen featuring the active zone.

Figure 9:
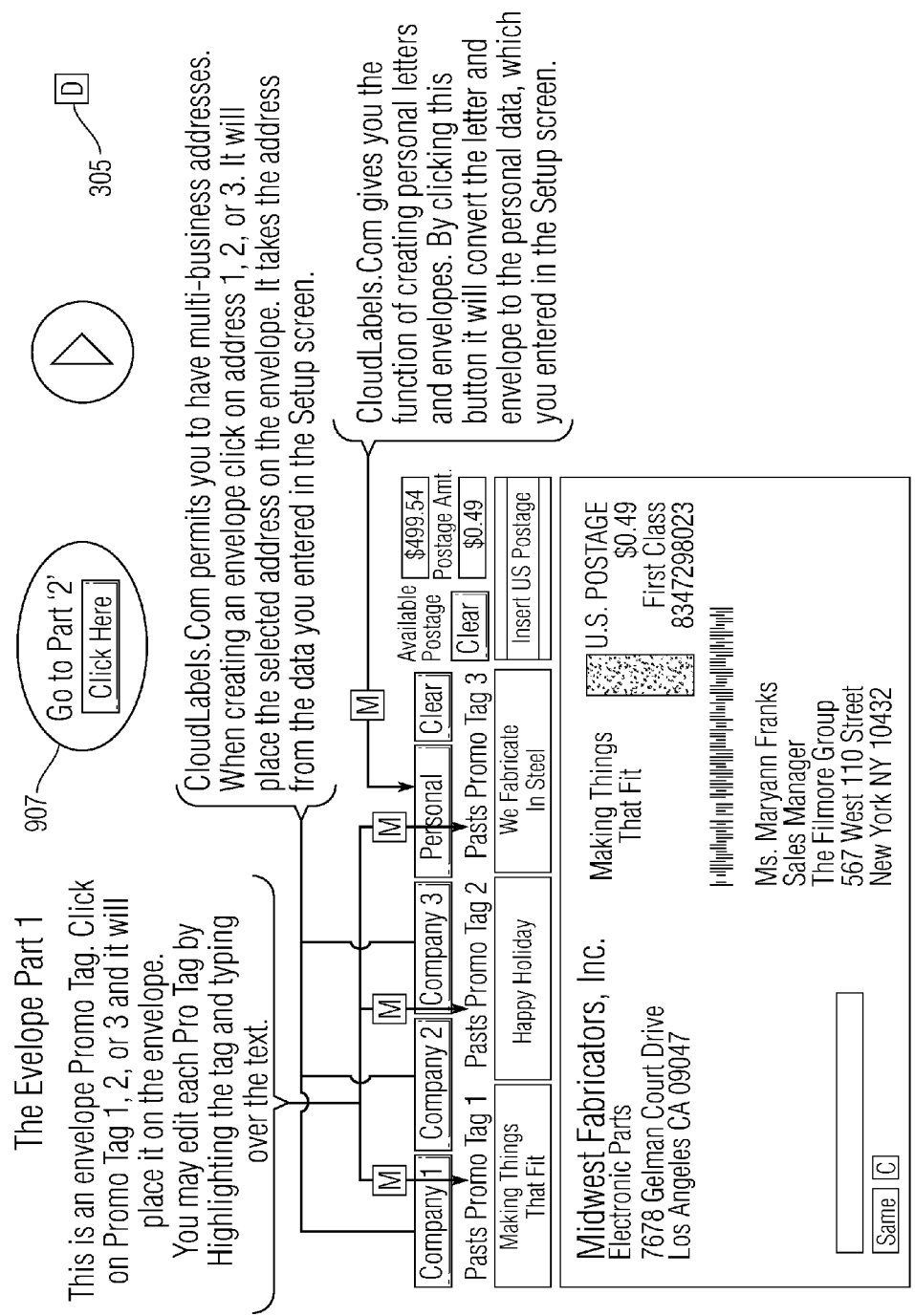
FIG. 9 depicts a screenshot of an exemplary host software user interface screen that integrates a fourth virtual button and a plurality of annotated links of the help file system in accordance with at least one embodiment disclosed herein.

For example, FIG. 9 shows a screenshot of an active zone of the host interface screen of FIGS. 3A-B. Because the active zone shown in FIG. 9 has many different actionable fields and/or operations (e.g., buttons, input fields), only some of the actionable fields are overlaid with annotated links. As such, the host interface screen of FIG. 9 features a fourth virtual button 907, which upon activation, causes the host interface screen to be transformed to a screen as shown in FIG. 10 (further discussed below in reference to step S430), in which the remaining annotated links that could not fit on the screen of FIG. 9, are now displayed.

With continued reference to FIG. 2C, at step S425, the processor 110 executing one or more software modules 130, including preferably host software application 132 and help file application 134, configures the computing device 105, in response to activation of a fourth virtual buttons, to retrieve one or more help files associated with the activated fourth virtual button. As discussed above, in one or more implementations, an active zone may have so many actionable fields that all the annotated links associated with the actionable fields cannot be displayed on one screen. As such, in certain implementations, the help files associated with the annotated links that are not displayed have not yet been retrieved. Thus, in one or more embodiments, these yet-to-be-retrieved help files are associated with the fourth virtual button(s). As such, activation of the fourth virtual button causes the computing device to retrieve the one or more help files associated with the annotated links that were not displayed from database 180. As noted above for step S225 and S325, in other implementations, the help files can alternatively be stored in memory 120, or could be stored on a remote server or computing device (e.g., remote server 195).

At step S430, the processor 110 executing one or more software modules 130, including preferably host software application 132 and help file application 134, configures the computing device 105, in response to activation of a fourth virtual button, to transform the host interface screen. In one or more embodiments, following the activation of a fourth virtual button, the processor 110 configures the computing device 105 to transform the host interface screen such that the annotated links shown on the host interface screen (a first set of annotated links), which are not associated with the activated fourth virtual button, are removed from the zone of the host interface screen. Further, in addition to removing the first set of annotated links, the processor 110 configures the computing device 105 to overlay the zone with the annotated links that are associated with the activated fourth virtual button (a second set of annotated links). The second set of annotated links is associated with the help files retrieved at step S425.

Figure 10:
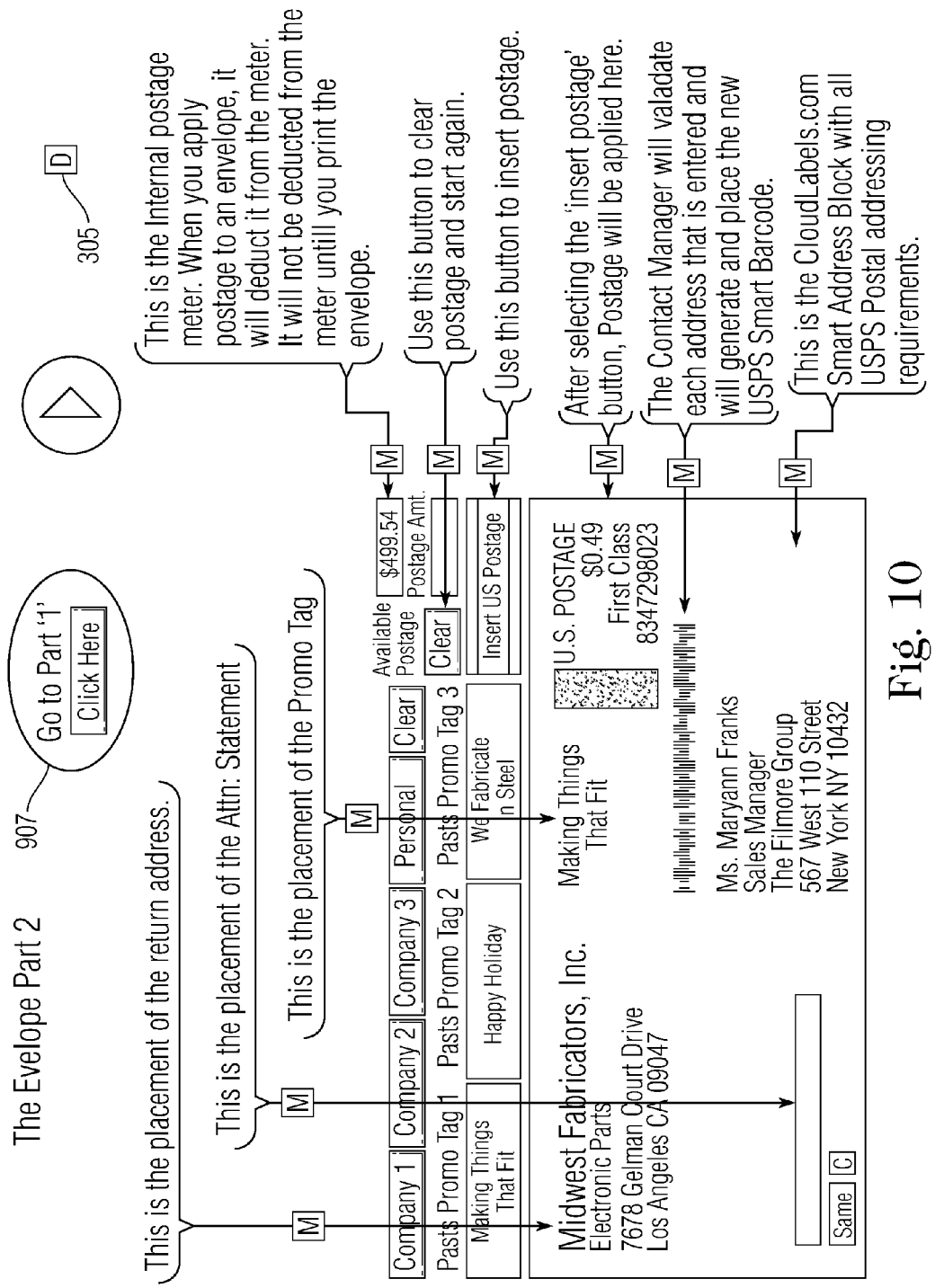
FIG. 10 depicts a screenshot of another exemplary host software user interface screen that integrates a fourth virtual button and a plurality of annotated links of the help file system in accordance with at least one embodiment disclosed herein.

An example implementation of step S430 is shown at FIGS. 9-10. As discussed above, FIG. 9 shows a screenshot of an active zone having many different actionable fields only some of the actionable fields are overlaid with annotated links as all of the annotated links associated with the actionable fields cannot fit on one screen. As such, the host interface screen of FIG. 9 features a fourth virtual button 907, which upon activation, causes the host interface screen to be transformed to the screen shown in FIG. 10 in which the remaining annotated links that could not fit on the screen of FIG. 9 are displayed. Specifically, in FIG. 9 some of the actionable fields (e.g., buttons) such as "Company 1", "Company 2", "Company 3", and Personal" display annotated links. However, as shown at FIG. 10, once the host interface has been transformed via activation of the fourth virtual button, the annotated links displayed on the screen of FIG. 9 are removed, and annotated links associated with the other actionable fields (e.g., the address lines, the return address lines, and the postage area of the envelope) are shown. As shown at FIG. 10, in one or more implementations, the transformed host interface screen can still include a fourth virtual button 907; however, activation of the fourth virtual button on the transformed screen causes the processor 110 to configure the computing device 105 to transform the host interface screen back to the previous screen.

With continued reference to FIG. 2C, at step S435 the processor 110 executing one or more software modules 130, including preferably host software application 132 and help file application 134, configures the computing device 105, in response to activation of one of the plurality of annotated links associated with active subzone, to display a help file. In one or more embodiments, on the transformed host interface screen (step S430), each of the annotated links is a link to at least one associated help files 182. Thus, upon activation of one of the annotated links (e.g., via user input), the processor 110 can configure the computing device 105 to display the associated help file. As discussed above in reference to step S335, in one or more embodiments, the displayed help file can overlay the entire host interface screen, or can overlay only a portion of the host interface screen, or alternatively, can be displayed on the display screen of the computing device 105 using an application other than the host software application 134 or help file application 134, such as a web browser application.

At step S440, the processor 110 executing one or more software modules 130, including preferably host software application 132 and help file application 134, configures the computing device 105 to return the host interface screen to its previous state in response to activation of the general virtual help button. Similar to steps S240 and S340, in instances in which the host interface screen displays a help file, one or more annotated links, one or more third virtual buttons, and/or one or more specific virtual help buttons, activation of the general virtual help button, will transform the host interface screen back to the previous iteration of the host interface screen. For example, when the host interface screen is displaying the second set of annotated links (e.g., FIG. 10), activation of the general virtual help button causes the processor 100 to configure the computing device to transform the host interface screen back to the previous screen in which the first set of annotated links are now visible again to the user (e.g., FIG. 9). Alternative methods for exiting the help screens and returning to the host interface screen are also possible without departing from the scope of the invention. In one or more embodiments, the process then ends at step S445.

FIG. 2D shows additional aspects of routine 200 and illustrates broad aspects of the method of the present application in accordance with at least one embodiment. With reference to FIG. 2D, at step S520, the processor 110 executing one or more software modules 130, including preferably host software application 132 and help file application 134, configures the computing device 105 to generate and display one or more fifth virtual buttons (virtual video buttons) on the host interface screen. In one or more embodiments, after the host interface screen has been transformed such that only an active zone and its annotated links are present on host interface screen (or, in certain implementations contemporaneously), the processor 110 can configure the computing device 105 to generate and display one or more virtual video buttons on the host interface screen. In certain implementations, an active zone can have, in addition to annotated links to help files, one or more virtual video buttons that are associated with video help files related to the actionable fields and/or operations of the active zone. As such, in this implementation, the processor 110 can configure the computing device 105 to generate and display at least one virtual video button, where activation of the virtual video button results in the transformation of the host interface screen and the display of the video file, as will be discussed in greater detail below.

Figure 11:
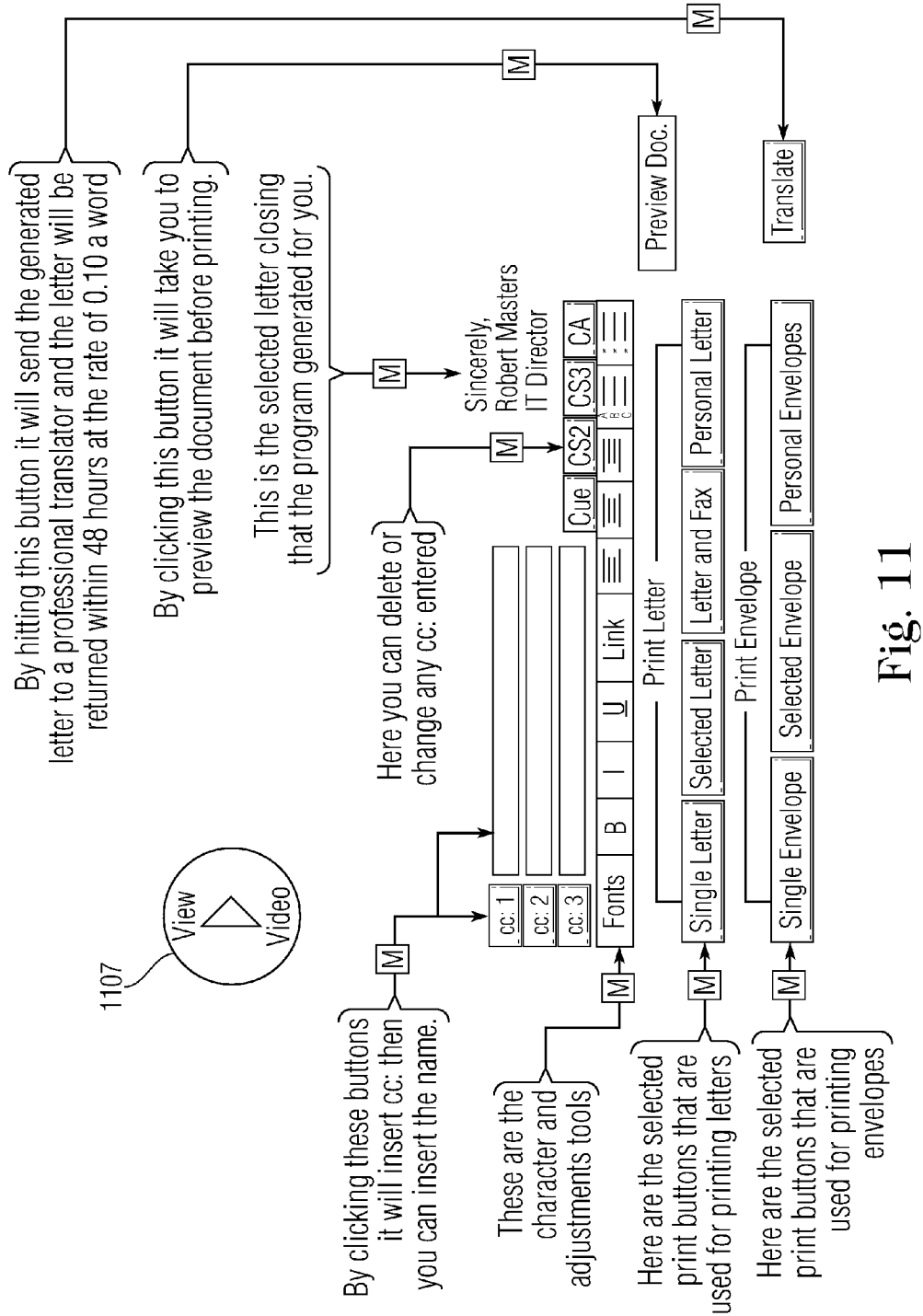
FIG. 11 depicts a screenshot of another exemplary host software user interface screen that integrates a virtual video button of the help file system in accordance with at least one embodiment disclosed herein.

For example, FIG. 11 shows a screenshot of an active zone of the host interface screen of FIGS. 3A-B. The active zone show in FIG. 11 has actionable fields and/or operations overlaid with annotated links as well as a virtual video button 1107. Activation of the virtual video button 1107 causes the host interface screen to be transformed to a screen as shown in FIG. 12 (further discussed below in reference to step S530), in which the video file associated with the virtual video button 1107 can be displayed.

With continued reference to FIG. 2D, at step S525, the processor 110 executing one or more software modules 130, including preferably host software application 132 and help file application 134, configures the computing device 105, in response to activation of a virtual video button, to retrieve one or more video help files associated with the activated virtual video button. As discussed above, in one or more implementations, an active zone can have actionable fields with associated annotated links, as well as one or more virtual video buttons associated with at least one of the actionable fields and/or operations of the active zone. Each virtual video button is associated with at least one video help file. As such, activation of a virtual video button causes the computing device to retrieve the one or more video help files associated with the virtual help files. As well the help files 182, the video help files 184 can be stored in database 180, and thus, at step S525, retrieved from database 180. In other implementations, the video help files 184 can alternatively be stored in memory 120, or could be stored on a remote server or computing device (e.g., remote server 195).

At step S530, the processor 110 executing one or more software modules 130, including preferably host software application 132 and help file application 134, configures the computing device 105, in response to activation of a virtual video button, to transform the host interface screen. In one or more embodiments, following the activation of the virtual video button, the processor 110 configures the computing device 105 to transform the host interface screen such that a video player is shown on the host interface screen. In one or more implementations, the video player overlays the entire host interface screen. Alternatively, the video player can overlay only a portion of the host interface screen.

Figure 12:
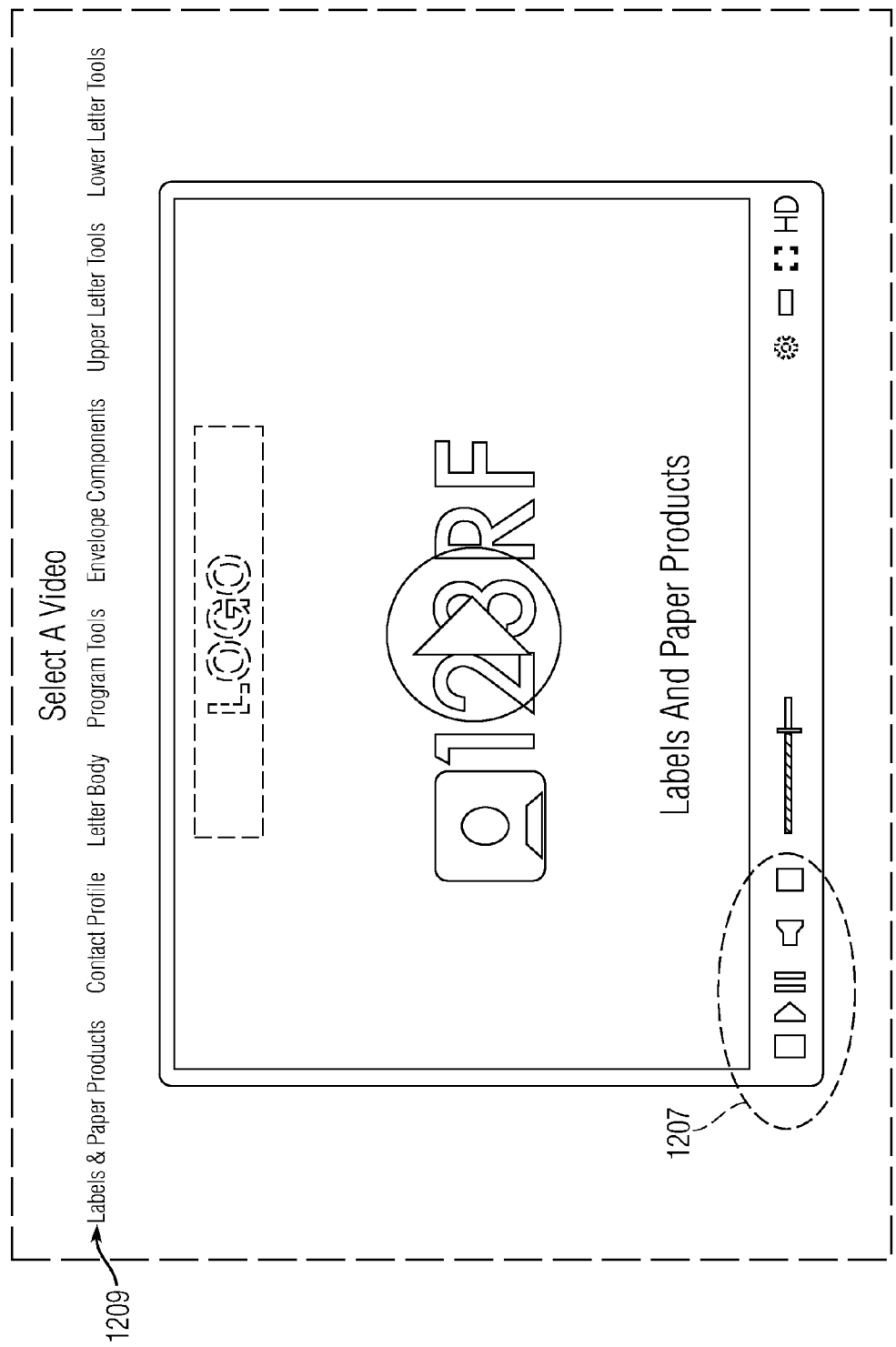
FIG. 12 depicts a screenshot of another exemplary host software user interface screen that integrates a video player links to video help files of the help file system in accordance with at least one embodiment disclosed herein.

An example implementation of step S530 is shown at FIGS. 11-12. As discussed above, FIG. 11 shows a screenshot of an active zone having actionable fields that overlaid with annotated links, as well as a virtual video button 1107. Activation of the virtual video button 1107 causes the host interface screen to be transformed to the screen shown in FIG. 12 in which a video player overlays the entire host interface screen.

With continued reference to FIG. 2D, at step S535 the processor 110 executing one or more software modules 130, including preferably host software application 132 and help file application 134, configures the computing device 105 to play the associated video help file. In one or more embodiments, on the transformed host interface screen (step S530), the video player of the transformed host interface screen can include a "play" button 1207 and other buttons associated with video playback (e.g., pause button, stop button, volume control), where activation of the play button 1207 will cause the computing device 105 to play the video help file. As discussed above, in one or more embodiments, the displayed video help file can overlay the entire host interface screen, or can overlay only a portion of the host interface screen. Alternatively, in at least one implementation, the computing device 105 can be configured to play the video help file on the display screen of the computing device 105 using an application other than the host software application 134 or help file application 134, such as a web browser application or a separate video player application.

In certain embodiments, such as the embodiment shown at FIG. 12, the video player can also provide links 1209 to other video help files associated with other actionable fields within the active zone and/or other video help files associated with actionable fields in other zones. As such, when the video player is overlaying the host interface screen, activation of a link 1209 to another video help file will cause the computing device to retrieve the new video help file from the database 180 and transform the host interface screen such that the video player displays the new video help file.

At step S540, the processor 110 executing one or more software modules 130, including preferably host software application 132 and help file application 134, configures the computing device 105 to return the host interface screen to its previous state in response to activation of the general virtual help button. For instance, similar to step S440, in instances in which the host interface screen displays a video help file, activation of the general virtual help button causes the processor 100 to configure the computing device 105 to transform the host interface screen back to the screen in which the annotated links and the virtual video button are now visible again to the user (e.g., FIG. 11). Alternative methods for exiting the help screens and returning to the host interface screen are also possible without departing from the scope of the invention. In one or more embodiments, the process then ends at step S545.

It should be understood that although much of the foregoing description has been directed to systems and methods for providing an interactive help file for a host software user interface, the system and methods disclosed herein can be similarly deployed and/or implemented in scenarios, situations, and settings far beyond the referenced scenarios. It can be readily appreciated that the system 100 can be effectively employed using various host software interfaces. It should be further understood that any such implementation and/or deployment is within the scope of the system and methods described herein.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present disclosure need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for providing an interactive help file for a host software user interface. The flowcharts and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A method for providing an interactive help file for a host software user interface, performed by a computing device, the computing device being connected to a network and having a memory, a processor, and a host software application and a help file application stored in the memory and executable in the processor, the method comprising:
   providing a host interface screen having a plurality of actionable fields;
   generating and displaying on the host interface screen a first virtual button, wherein the first virtual button overlays a portion of the host interface screen;
   segmenting the host interface screen into a plurality of zones;
   generating and displaying on the host interface screen, in response to activation of the first virtual button, a plurality of second virtual buttons, wherein the plurality of second virtual buttons each overlay and are associated with a respective zone among the plurality of zones;
   in response to activation of one of the plurality of second virtual buttons,
      retrieving, from a storage coupled to the server, one or more help files associated with the activated second virtual button; and
      transforming the host interface screen, wherein the step of transforming comprises:
         deactivating zones of the host interface screen that are not associated with the activated second virtual button;
         overlaying the zone associated with the activated second virtual button with a first set of one or more annotated links associated with respective portions of the retrieved help files; and
         displaying the transformed host interface screen, whereby the user is provided with the transformed host interface screen and can access the retrieved one or help files, and wherein the annotated links include one or more of: text and one or more links to further information contained in the help file.

2. The method of claim 1, wherein the step of deactivating zones includes one or more of:
   removing the plurality of second virtual buttons that are not activated and removing from view, deemphasizing, or obscuring one or more portions of the zones that are not associated with the activated second virtual button.

3. The method of claim 1, wherein the transforming step further comprises:
   configuring actionable fields within the zone associated with the activated second virtual button to be interactive and actionable fields within zones not associated with the activated second virtual button to be inactive, whereby user input into actionable fields within the zone associated with the activated second virtual button is recorded and user input into actionable fields within zones not associated with the activated second virtual button is prevented.

4. The method of claim 1, further comprising:
   in response to activation of one of the annotated links, displaying the further information contained in the help file that is associated with the activated annotated link.

5. The method of claim 1, further comprising:
   segmenting the zone associated with the activated second virtual button into a plurality of subzones, wherein each annotated link overlays a respective subzone.

6. The method of claim 5, wherein at least one annotated link comprises and is associated with a third virtual button, and the third virtual button is associated with the subzone overlaid by the annotated link associated with the third virtual button.

7. The method of claim 6, further comprising:
   in response to activation of the third virtual button,
      transforming the host interface screen, wherein the step of transforming comprises:
         removing the subzones that are not associated with the activated third virtual button; and
         overlaying the subzone associated with the activated third virtual button with a second set of one or more annotated links to the retrieved help files, whereby the user receives the transformed host interface screen and can access the retrieved help files associated with the second set of one or more annotated links.

8. The method of claim 7, further comprising:
   configuring actionable fields within the subzone associated with the activated third virtual button to be interactive and actionable fields within subzones not associated with the activated third virtual button to be inactive, whereby user input into actionable fields within the subzone associated with the activated third virtual button is recorded and user input into actionable fields within subzones not associated with the activated third virtual button is prevented.

9. The method of claim 1, wherein the step of transforming further comprises:

overlaying the zone associated with the activated second virtual button with at least one fourth virtual button.

10. The method of claim 9, further comprising:
in response to activation of at least one fourth virtual button,
retrieving, from a storage coupled to the server, one or more help files associated with the activated fourth virtual button; and
transforming the host interface screen, wherein the step of transforming comprises:
removing the first set of one or more annotated links; and
overlaying the zone associated with the activated second virtual button with a third set of one or more annotated links to the retrieved help files, whereby the user receives the transformed host interface screen and can access the retrieved help files.

11. The method of claim 1, wherein the step of transforming further comprises:
overlaying the zone associated with the activated second virtual button with at least one virtual video button.

12. The method of claim 11, further comprising:
in response to activation of the virtual video button,
retrieving, from a storage coupled to the server, one or more video files associated with the activated virtual video button; and
displaying a video screen comprising the one or more video files.

13. The method of claim 12, wherein the video screen further comprises one or more links to additional video files.

14. The method of claim 1, further comprising:
in response to a second activation of the first virtual button,
transforming the host interface screen, wherein the step of transforming comprises:
removing the first set of one or more annotated links; and
inserting the zones of the host interface screen that are not associated with the activated second virtual button.

15. The method of claim 14, further comprising:
in response to a third activation of the first virtual button,
transforming the host interface screen, wherein the step of transforming comprises:
removing the plurality of second virtual buttons.

16. The method of claim 10, further comprising:
in response to a second activation of the first virtual button,
transforming the host interface screen, wherein the step of transforming comprises:
removing the third set of one or more annotated links; and
overlaying the zone associated with the activated second virtual button with the first set of one or more annotated links to the retrieved help files, whereby the user receives the transformed host interface screen and can access the retrieved help files.

17. The method of claim 1, wherein the help file application is an application provided independent of the host software application.

18. The method of claim 1, wherein the help file application interrupts operation of the host software application, and further comprising:
receiving, by the help file application, a user input to an actionable field within a zone among the plurality of zones;
translating the user input received by the help file application into a corresponding user input that is actionable by the host software application; and
providing, by the help file application, the corresponding user input to the host software application as an input to the actionable field.

19. The method of claim 1, further comprising:
dynamically updating the host interface screen in response to the user input to the actionable field.

* * * * *